(12) United States Patent
Cams et al.

(10) Patent No.: US 11,867,962 B2
(45) Date of Patent: Jan. 9, 2024

(54) CABLE FIXATION ASSEMBLY WITH STRENGTH MEMBER ANCHOR ADAPTER

(71) Applicant: COMMSCOPE TECHNOLOGIES LLC, Hickory, NC (US)

(72) Inventors: Eddy Luc Cams, Bilzen (BE); Johan Geens, Bunsbeek (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/761,105

(22) PCT Filed: Sep. 15, 2020

(86) PCT No.: PCT/US2020/050876
§ 371 (c)(1),
(2) Date: Mar. 16, 2022

(87) PCT Pub. No.: WO2021/055356
PCT Pub. Date: Mar. 25, 2021

(65) Prior Publication Data
US 2022/0334319 A1  Oct. 20, 2022

Related U.S. Application Data

(60) Provisional application No. 62/900,841, filed on Sep. 16, 2019.

(51) Int. Cl.
*G02B 6/44* (2006.01)
*G02B 6/36* (2006.01)

(52) U.S. Cl.
CPC ....... *G02B 6/44765* (2023.05); *G02B 6/4477* (2013.01); *G02B 6/3616* (2013.01)

(58) Field of Classification Search
CPC .................. G02B 6/44765; G02B 6/4477
See application file for complete search history.

(56) References Cited

U.S. PATENT DOCUMENTS

| | | | |
|---|---|---|---|
| 3,552,696 A | 1/1971 | Orenick | |
| 4,279,466 A * | 7/1981 | Makuch | G02B 6/3835 385/59 |

(Continued)

FOREIGN PATENT DOCUMENTS

| | | |
|---|---|---|
| DE | 37 26 718 A1 | 2/1989 |
| EP | 0 646 294 B1 | 11/1996 |

(Continued)

OTHER PUBLICATIONS

International Search Report and Written Opinion of the International Searching Authority for International Patent Application No. PCT/US2020/050876 dated Dec. 24, 2020, 11 pages.

(Continued)

*Primary Examiner* — Michael Stahl
(74) *Attorney, Agent, or Firm* — Merchant & Gould P.C.

(57) ABSTRACT

Devices, assemblies and methods for fixing telecommunications cables. The cable fixation assemblies include cable support bodies adapted to anchor yarn strength members. A rod strength member adapter can be coupled to the cable support body to anchor a rod strength member such that the same cable support body is adapted to fix both a cable having a yarn strength member and a cable having a rod strength member.

17 Claims, 20 Drawing Sheets

(56) References Cited

U.S. PATENT DOCUMENTS

| | | | |
|---|---|---|---|
| 4,552,998 A | 11/1985 | Ziegler | |
| 4,986,761 A | 1/1991 | Gladden, Jr. et al. | |
| 4,991,928 A * | 2/1991 | Zimmer | G02B 6/4439 |
| | | | 385/137 |
| 5,097,529 A * | 3/1992 | Cobb | G02B 6/4442 |
| | | | 385/135 |
| 5,121,458 A | 6/1992 | Nilsson et al. | |
| 5,440,666 A | 8/1995 | Burek et al. | |
| 5,455,391 A | 10/1995 | Demesmaeker et al. | |
| 5,491,766 A | 2/1996 | Huynh | |
| 5,502,282 A | 3/1996 | Kunze | |
| 5,696,351 A | 12/1997 | Benn et al. | |
| 5,775,702 A | 7/1998 | Laeremans et al. | |
| 5,793,921 A * | 8/1998 | Wilkins | G02B 6/4446 |
| | | | 385/136 |
| 5,814,770 A | 9/1998 | Pieck et al. | |
| 5,824,961 A | 10/1998 | Burek et al. | |
| 5,883,333 A | 3/1999 | Wambeke et al. | |
| 6,051,792 A | 4/2000 | Damm et al. | |
| 6,150,608 A | 11/2000 | Wambeke et al. | |
| 6,269,214 B1 * | 7/2001 | Naudin | G02B 6/4454 |
| | | | 385/135 |
| 6,322,378 B1 | 11/2001 | Auclair | |
| 6,933,442 B2 | 8/2005 | Franks, Jr. | |
| 7,254,307 B2 | 8/2007 | Kin | |
| 8,903,216 B2 | 12/2014 | Thompson et al. | |
| 9,753,239 B2 | 9/2017 | Allen et al. | |
| 10,209,473 B2 | 2/2019 | Bishop et al. | |
| 10,495,838 B2 | 12/2019 | Coenegracht et al. | |
| 2004/0226734 A1 | 11/2004 | Franks | |
| 2006/0150483 A1 | 7/2006 | Zayer | |
| 2006/0275006 A1 | 12/2006 | Xin | |
| 2006/0283619 A1 | 12/2006 | Kowalczyk et al. | |
| 2007/0235422 A1 | 10/2007 | Bornemann | |
| 2010/0054688 A1 | 3/2010 | Mullaney et al. | |
| 2010/0061692 A1 | 3/2010 | Hetzer et al. | |
| 2010/0092147 A1 * | 4/2010 | Desard | G02B 6/4477 |
| | | | 385/136 |
| 2011/0075974 A1 * | 3/2011 | Katagiyama | G02B 6/3888 |
| | | | 385/78 |
| 2012/0177334 A1 | 7/2012 | Holmberg et al. | |
| 2012/0230646 A1 | 9/2012 | Thompson et al. | |
| 2013/0058616 A1 | 3/2013 | Cote et al. | |
| 2013/0243386 A1 * | 9/2013 | Pimentel | G02B 6/4401 |
| | | | 385/135 |
| 2013/0315551 A1 * | 11/2013 | Claessens | G02B 6/4447 |
| | | | 385/136 |
| 2014/0241674 A1 * | 8/2014 | Isenhour | G02B 6/428 |
| | | | 29/829 |
| 2014/0270677 A1 | 9/2014 | Sievers et al. | |
| 2014/0314388 A1 | 10/2014 | Alaerts et al. | |
| 2015/0093090 A1 | 4/2015 | Aznag et al. | |
| 2015/0168663 A1 | 6/2015 | Aznag et al. | |
| 2016/0077300 A1 | 3/2016 | Geens et al. | |
| 2018/0157002 A1 * | 6/2018 | Bishop | H02G 15/115 |
| 2018/0261986 A1 | 9/2018 | Kempeneers et al. | |
| 2023/0129717 A1 * | 4/2023 | Coenegracht | G02B 6/4477 |
| | | | 385/136 |

FOREIGN PATENT DOCUMENTS

| | | |
|---|---|---|
| EP | 0 646 295 B1 | 12/1996 |
| EP | 2 551 708 A1 | 1/2013 |
| EP | 2 647 095 B1 | 8/2014 |
| GB | 2 298 053 A | 8/1996 |
| JP | 2012-154419 A | 8/2012 |
| KR | 10-1606203 B1 | 3/2016 |
| WO | 06/09671 A1 | 3/1996 |
| WO | 96/24185 A1 | 8/1996 |
| WO | 97/12268 A1 | 4/1997 |
| WO | 02/073281 A1 | 9/2002 |
| WO | 2005/020400 A1 | 3/2005 |
| WO | 2009/040566 A1 | 4/2009 |
| WO | 2012/121955 A1 | 9/2012 |
| WO | 2013/037746 A1 | 3/2013 |
| WO | 2013/092220 A1 | 6/2013 |
| WO | 2013/149846 A1 | 10/2013 |
| WO | 2013/149922 A1 | 10/2013 |
| WO | 2017/114936 A1 | 7/2017 |
| WO | 2018/154125 A1 | 8/2018 |
| WO | 2018/208518 A1 | 11/2018 |
| WO | 2019/034613 A1 | 2/2019 |
| WO | 2019/072782 A1 | 4/2019 |
| WO | 2019/072852 A1 | 4/2019 |
| WO | 2019/241502 A1 | 12/2019 |
| WO | 2020/104395 A1 | 5/2020 |
| WO | 2020/154418 A1 | 7/2020 |
| WO | 2020/212365 A1 | 10/2020 |
| WO | 2020/219571 A1 | 10/2020 |

OTHER PUBLICATIONS

European Extended Search Report for PCT/US2020/050876 dated Aug. 21, 2023 (6 pages).

* cited by examiner

CABLE FIXATION ASSEMBLY WITH STRENGTH MEMBER ANCHOR ADAPTER

CROSS-REFERENCE TO RELATED APPLICATION

This application is a National Stage Application of PCT/US2020/050876, filed on Sep. 15, 2020, which claims the benefit of U.S. Patent Application Ser. No. 62/900,841, filed on Sep. 16, 2019, the disclosures of which are incorporated herein by reference in their entireties. To the extent appropriate, a claim of priority is made to each of the above disclosed applications.

TECHNICAL FIELD

The present disclosure relates to fixing a portion of a telecommunications cable. In some examples, the telecommunications cable is fixed within an interior volume of a telecommunications closure.

BACKGROUND

Telecommunications systems typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, wave division multiplexers, fiber management trays, cable organizing and routing components, etc.

In certain applications, the enclosure/housing is water and contaminant (e.g., dust) proof or water-resistant. In particular, water, moisture, cleaning fluids, dust, etc., present at the exterior of the housing/enclosure should be prevented by the housing/enclosure from reaching components within the interior of the enclosure/housing. To provide such protection, enclosures can include a seal (e.g., a gel seal) around the perimeter of the enclosure or portions of the perimeter of the enclosure. To accommodate cables entering the enclosure through ports in the enclosure wall, sealing members positioned at the port locations of the enclosure can define cable passages such that the sealing blocks form seals around the cables.

Typically, cables entering telecommunications enclosures must be fixed in place inside the enclosure. Within the closure, and depending on the type of cable, protective components of the cable, such as a jacket, a buffer tube, strength members, etc., are stripped, truncated, or removed, allowing the optical fibers held by the cable to be managed within the closure. One or more of these cable components may be fixed in place using a cable fixation assembly.

Fixing cables in telecommunications closures can be important to minimize damage to, or over-bending of, the exposed fibers within the closure.

SUMMARY

In general terms, the present disclosure is directed to improvements in the fixation of cables. The contents of U.S. Provisional Patent Application Nos. 62/836,974 filed Apr. 22, 2019 and 62/833,955 filed Apr. 15, 2019 are hereby incorporated by reference in their entirety.

More particularly, the present disclosure is directed to improvements in the fixation relative to a telecommunications closure or other structure of a cable strength member, such as aramid yarn, or a rigid rod.

Some telecommunications cables include one or more optical fibers held within a protective buffer tube. Cables of relatively thin diameter and relatively lower rigidity can include a yarn strength member, e.g., aramid yarn positioned around the buffer tube in between the buffer tube and an outer protective jacket of the cable. Thicker, more rigid cables can include one or more rigid rods that provide strength to the cable and thereby act as strength members. The rigid rod can be centered at the cable axis, or two rods can be spaced apart offset from each other along a transverse diameter of the cable. The rigid rod(s) can be made from a rigid material, such as fiberglass or metal.

In some examples, the cable can be electrically grounded by connecting the one or more metal strength member rods to an electrical ground.

It will be appreciated that fixation principles of the present disclosure can apply to cables of different configurations, e.g., cables with or without buffer tubes, and cables with or without additional components, such as conductive shields. In some examples, the cable to be fixed has simply an outer jacket housing, one or more signal conductors (e.g., optical fibers and/or or electrical conductors) and a fibrous or yarn-like material within the outer jacket. Such fibrous material is often incorporated into cables to add strength to the cable (e.g., resistance to lateral loads) while still permitting flexing or bending of the cable. In some examples, the fibrous material is, or includes, aramid yarn.

When fixing such a telecommunications cable, it can be advantageous to anchor the strength member, whether the strength member is fibrous material or one or more rigid rods. Anchoring the strength member material can, e.g., minimize undesirable stresses on or shifting of the exposed optical fiber(s) (or other signal conduits). The exposed optical fibers are delicate and are often managed in ways (e.g., splicing, splitting) that are sensitive to external loads. For example, external forces on the optical fibers can cause breakage or bending of an optical fiber beyond its minimum bend radius, which can result in deterioration of signal transmission. In addition, if not suitably anchored, a strength member rod can detrimentally creep or shift, potentially damaging an exposed optical fiber, while the threads of a fibrous strength member material can have a tendency to separate and spread out, which can interfere with adjacent cables and fixation assemblies. For example, stray strength member threads from one cable can become undesirably attached to an adjacent cable or cable fixation assembly.

Aspects of the present disclosure provide for cable fixation assemblies that accommodate fixation of multiple strength member types, e.g., both rigid strength rods and yarn (e.g., aramid yarn).

A typical telecommunications closure includes one or more ports through which cables enter the interior volume of the closure. Within the closure, optical fibers from the cable are managed, e.g., spliced, split, indexed, stored, connected via connectors to fibers of other cables entering the closure, etc. The ports include seals that seal around the cable. The same closure can support multiple cables of different diameters and different types. It can be advantageous to provide cable fixation assemblies for the closures that are suited to fix multiple different types of cables, such as both cables that include rigid rod strength members and cables that include yarn strength members.

Typically, a cable fixation assembly will include an anchor for one type of strength member, e.g., a fibrous or yarn strength member, but not another type of strength member (e.g., a rigid rod), and a cable support body of a given cable fixation assembly is dedicated to one or the other type of cable strength member.

According to an aspect of the present disclosure, a cable fixation assembly is provided having a cable support body that includes a first type of strength member anchor and being adaptable to anchor a second type of strength member by coupling a strength member anchor adapter to the cable support body.

According to another aspect of the present disclosure a rigid strength rod anchor of a cable fixation assembly includes a press screw, and a bracket having a press plate, the bracket having a bracket height generally corresponding to a thickness of a bracket mount of the rigid strength rod anchor such that the press plate sits above the rigid strength rod, and wherein the press screw and the press plate are adapted to cooperate to bend the press plate away from the bracket mount and press against the rigid strength rod.

As used herein, terms such as "vertical," "horizontal," "vertically," "horizontally," "up," "down," "top," "bottom," "upper," "lower," "front," "back," "rear," "proximal," "distal," etc., are used only for ease of description in relating the position or orientation of one component relative to another and regardless of how the overall apparatus (e.g., the closure) may be used, positioned, or oriented in practice. For example, vertically spaced apart components as described herein may be horizontally or otherwise spaced apart in practice depending on how the telecommunications closure is oriented in the field or while it is being serviced.

According to certain aspects of the present disclosure, a cable fixation assembly comprises: a cable support body extending between a proximal end and an opposite distal end along a longitudinal axis of the cable support body, the cable support body including: a seat for seating a telecommunications cable; a strength member anchoring arrangement adapted to anchor a cable strength member of a first type; and a first coupler; and a strength member anchor adapter adapted to lockingly couple to the first coupler and further adapted to anchor a cable strength member of a second type, the second type being different from the first type.

According to further aspects of the present disclosure, a cable fixation assembly comprises a cable support body extending between a proximal end and an opposite distal end along a longitudinal axis of the cable support body, the cable support body including a seat for seating a telecommunications cable, the seat including a horizontal cable support surface facing vertically upwards; and a strength member anchor including: a main body; a bracket; and a press screw, the main body including a passage wall that defines a strength rod passage, the passage wall including a through hole for receiving the press screw; wherein the bracket includes a press plate, an upper plate having a through hole, and a connector connecting the press plate and the upper plate; wherein the bracket is configured to straddle the passage wall such that the press plate is within the strength rod passage and the upper plate is outside of the strength rod passage, and such that the press plate is engageable by the press screw extending through the through hole of the upper plate and through the through hole of the strength rod passage wall to bend the press plate at a downward incline away from the horizontal.

According to further aspects of the present disclosure, a telecommunications closure comprises first and second housing pieces configured to cooperate to define a sealable interior volume, and a cable fixation assembly according to the present disclosure mounted to the first or second housing piece within the interior volume.

According to further aspects of the present disclosure, a method of fixing a portion of a telecommunications cable, comprises: providing a cable support body extending between a proximal end and an opposite distal end along a longitudinal axis of the cable support body, the cable support body including: a seat for seating a telecommunications cable; a strength member anchoring arrangement adapted to anchor a cable strength member of a first type; and a first coupler; providing a strength member anchor adapter adapted to anchor a cable strength member of a second type, the second type being different from the first type; and at least one of: i) lockingly coupling the strength member anchor adapter to the first coupler and anchoring a cable strength member of the second type to the strength member anchor adapter; and ii) decoupling the strength member anchor adapter from the first coupler and anchoring a cable strength member of the first type to the strength member anchoring arrangement.

According to further aspects of the present disclosure, a method of fixing a portion of a telecommunications cable, comprises: providing a cable support body extending between a proximal end and an opposite distal end along a longitudinal axis of the cable support body, the cable support body including a seat for seating a telecommunications cable, the seat including a horizontal cable support surface facing vertically upwards; providing a strength member anchor including a main body, a bracket, and a press screw, the main body including a passage wall that defines a strength rod passage, the passage wall including a through hole for receiving the press screw, the bracket includes a press plate, an upper plate having a through hole, and a connector connecting the press plate and the upper plate; positioning the bracket to straddle the passage wall such that the press plate is within the strength rod passage and the upper plate is outside of the strength rod passage; inserting the press screw through the through hole of the upper plate and through the through hole of the strength rod passage wall; and rotating the press screw such that a tip of a shaft of the press screw bends the press plate at a downward incline away from the horizontal and applies force against a strength rod of the telecommunications cable.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
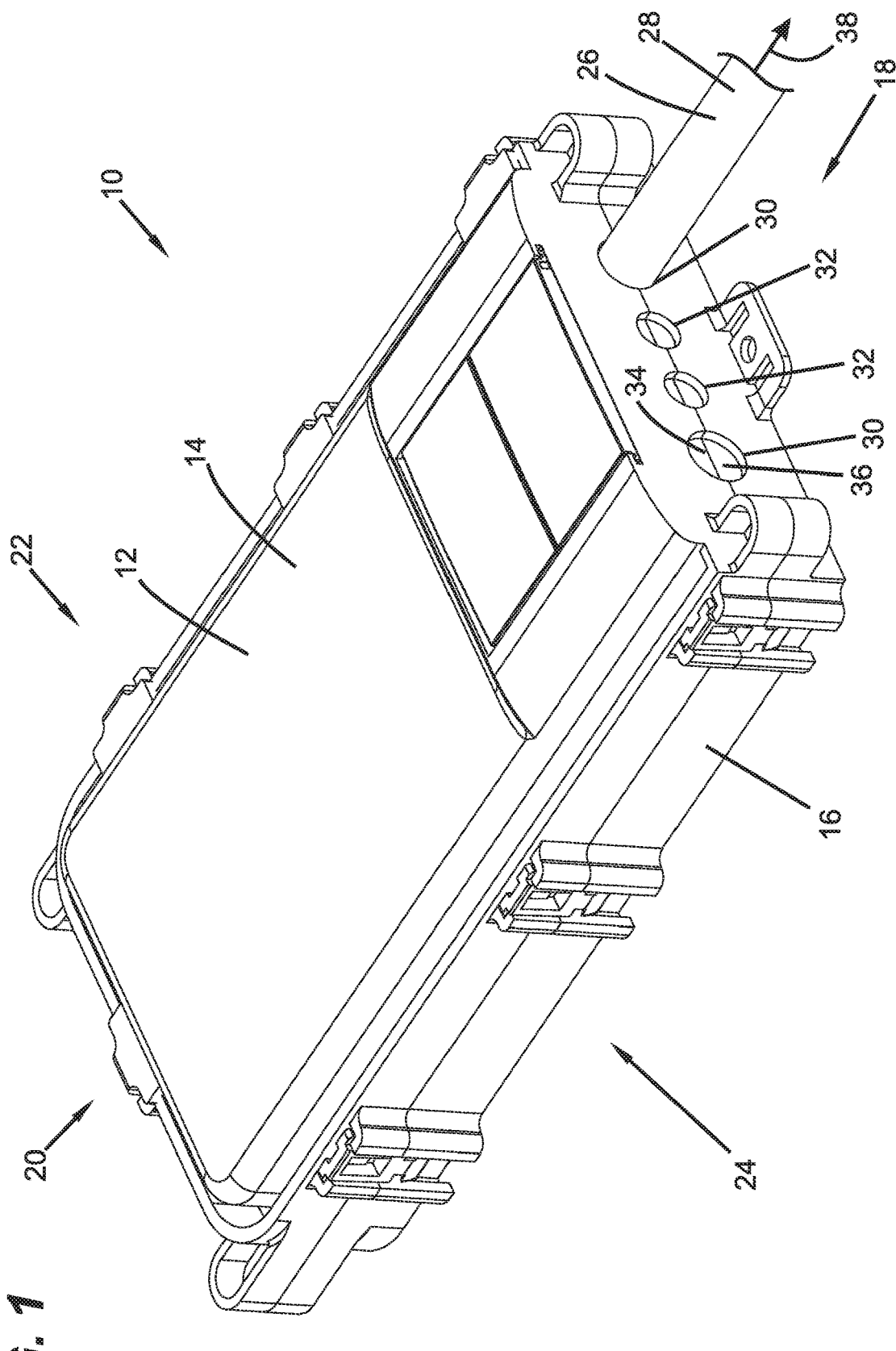
FIG. 1 is a perspective view of an example telecommunications system including a telecommunications closure and a cable in accordance with the present disclosure, the closure being in a closed configuration.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
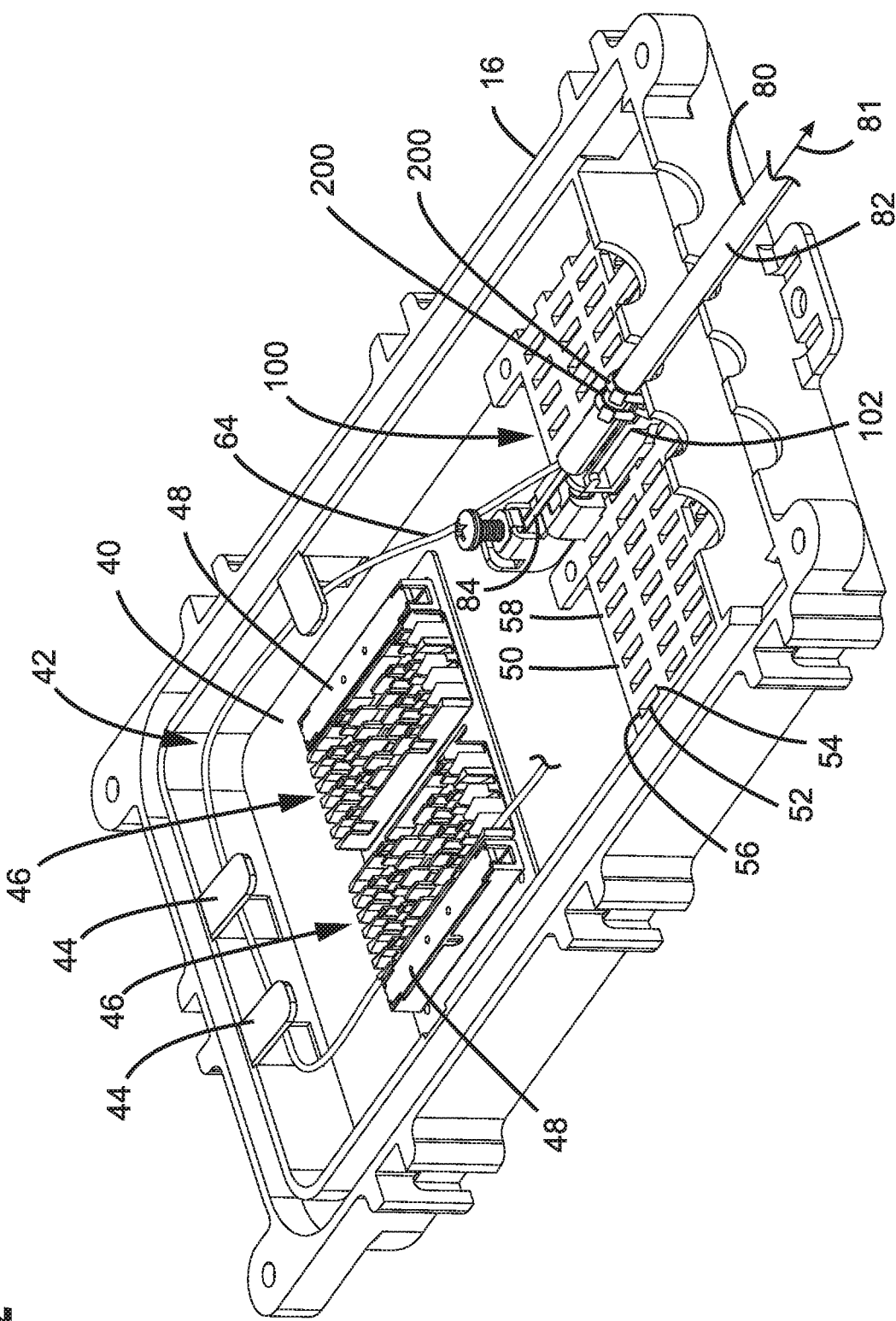
FIG. 2 is a perspective view of a cable having a rigid rod strength member and a portion of the closure of FIG. 1, the closure being in an open configuration, and showing an example of a cable fixation assembly in accordance with the present disclosure.

Referring to FIGS. 1-2, a telecommunications system 10 includes a closure 12 having a first housing piece 14 and a second housing piece 16 configured to cooperate with each other to form the closure 12 that is re-enterable and re-closable. Sealing members are disposed to form a seal between the housing pieces when the closure 12 is closed, thereby minimizing ingress of contaminants (e.g., moisture, dust, etc.) into the interior volume 40 of the closure 12. The closure extends from a proximal end 18 to a distal end 20, and has a top 22, and a bottom 24.

An example telecommunications cable 26 (e.g., a feeder cable) enters the interior volume 40 of the closure 12 through a port 30 defined by the housing pieces 14 and 16. The cable 26 is defined by a longitudinal cable axis 38 and includes an outer jacket 28 that radially surrounds the cable axis 38 and protects and provides structural support to the cable, and particularly to the one or more optical fibers carried by the cable. The housing pieces define a plurality of ports 30, 32 through which cables can enter the closure. The outer ports 30 are configured to receive relatively large cables, such as feeder cables, while the inner ports 32 are configured to receive relatively small cables, such as drop cables or distribution cables. Positioned at the ports and between the housing pieces 14 and 16 are cable port seal blocks 34, 36 that can seal around the cables as they enter the closure and/or seal off the ports where no cable is present.

The interior volume 40 includes a fiber management area 42 that includes fiber management devices and structures such as fiber retainers 44, splice holders 46 and splitter holders 48. Optical fibers, such as the optical fiber 64 entering the interior volume 40 via a cable 80 (having a longitudinal cable axis 81, an outer jacket 82, and a rigid rod strength member 84) are routed to the fiber management area 42 where they are managed, e.g., by storing them in loops, splicing them to other fibers, splitting them with splitters, etc. It should be appreciated that the fibers can be individual fibers or groups of fibers. Groups of fibers can be loosely bundled, e.g., in protection tubes, or connected, such as in the case of ribbon fibers.

Connected to the housing piece 16 and within the interior volume 40 is a base plate 50. The base plate 50 includes a plurality of elongate slots 52 elongated in the proximal to distal direction and extending between a proximal slot end 56 and a distal slot end 54 of the slot 52. The slots 52 extend through a thickness of the base plate 50, extending between the top surface 58 and an opposite bottom surface of the base plate 50.

Mounted to the base plate 50 is a cable fixation assembly 100 in accordance with the present disclosure. The cable fixation assembly 100 includes a cable support body 102 supporting a cable 80. The cable 80 is secured to cable support body 102 with tie wraps 200.

Figure 3:
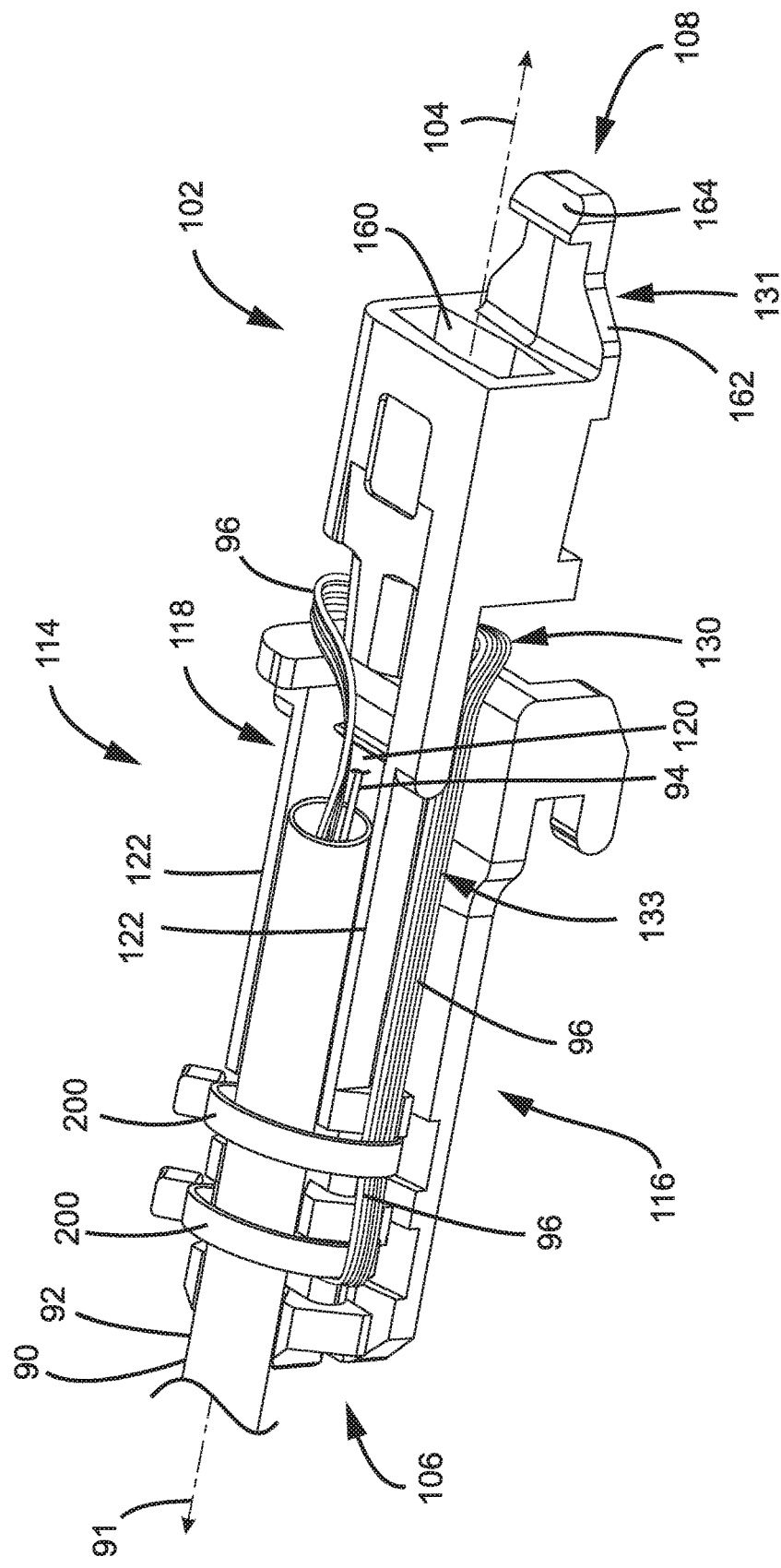
FIG. 3 is a perspective view of a portion of the cable fixation assembly of FIG. 2 and a cable having a yarn strength member.
Figure 4:
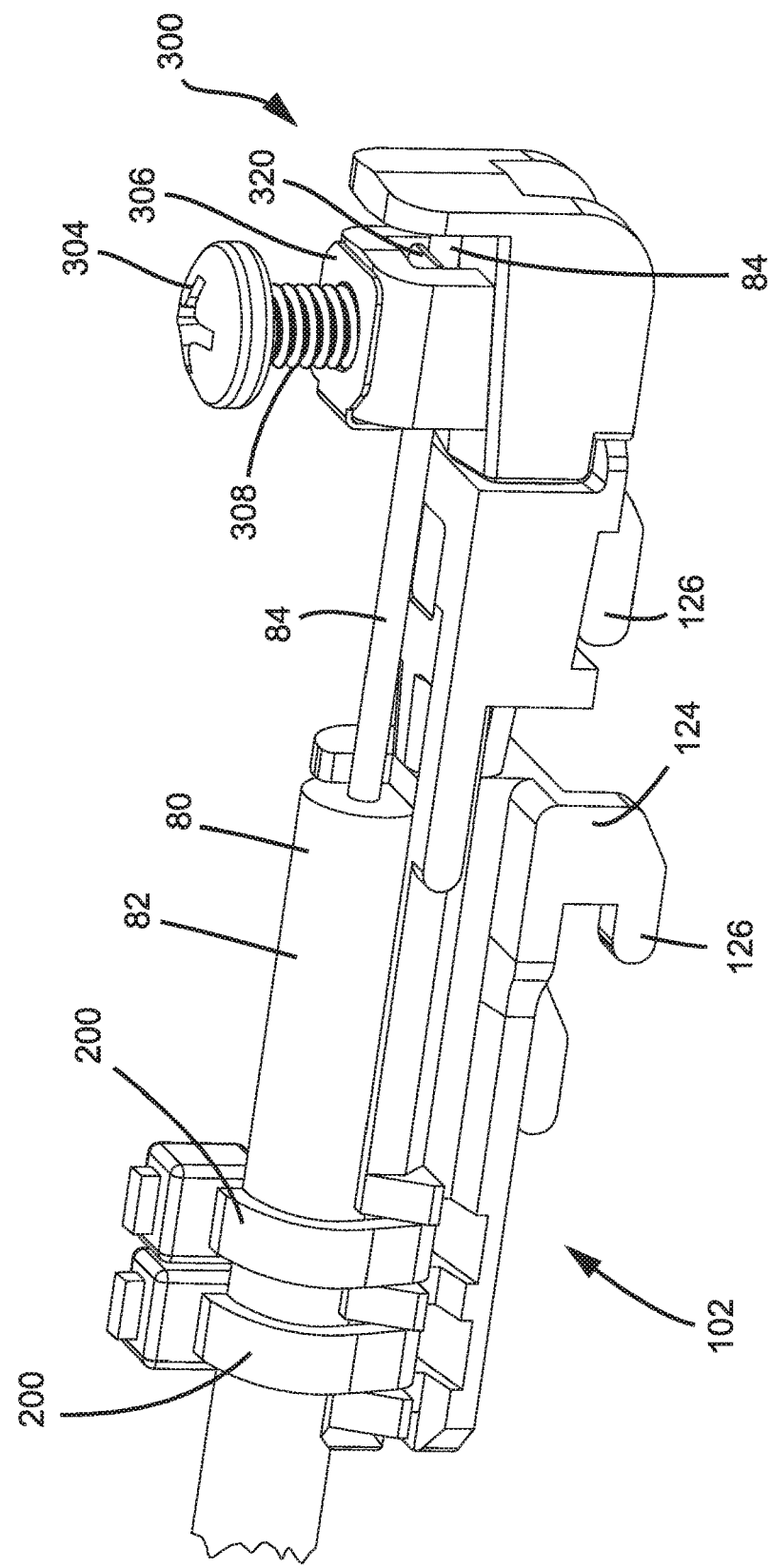
FIG. 4 is a perspective view of a portion of the cable fixation assembly and cable of FIG. 2.
Figure 5:
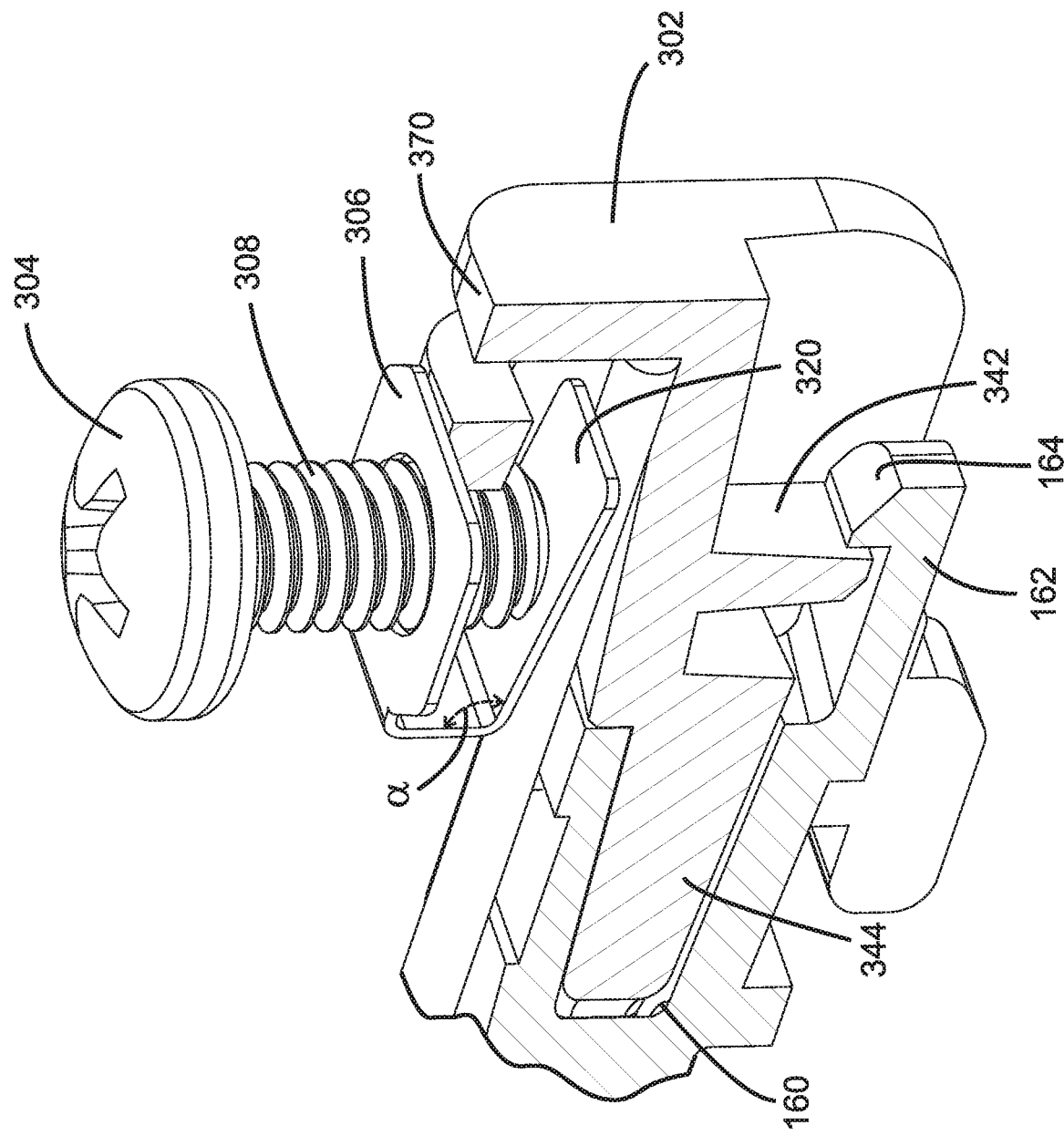
FIG. 5 is a perspective partial cross-sectional view of a portion of the cable fixation assembly and cable of FIG. 2.
Figure 6:
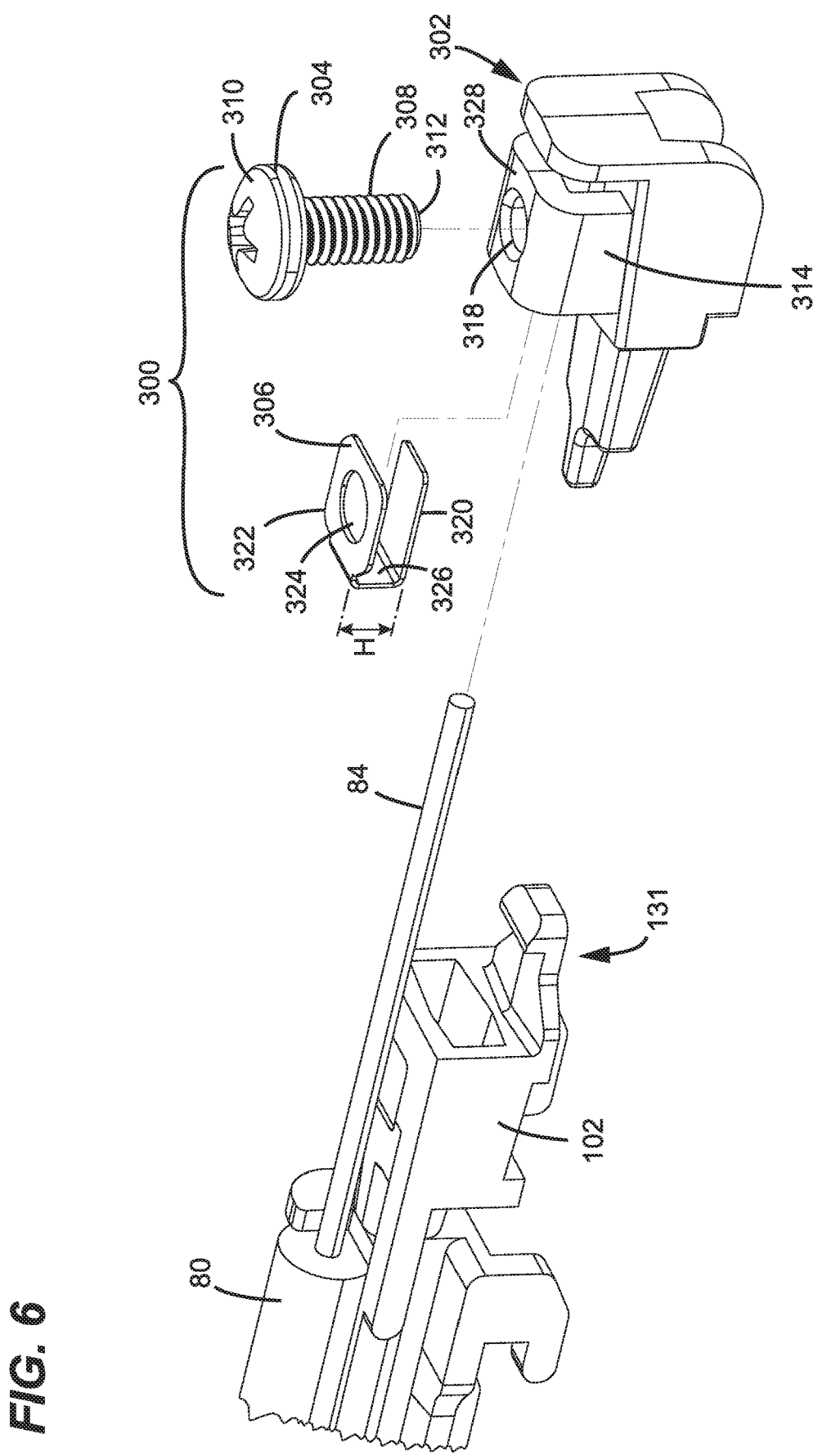
FIG. 6 is a partially exploded view of a portion of the cable fixation assembly of FIG. 2.
Figure 7:
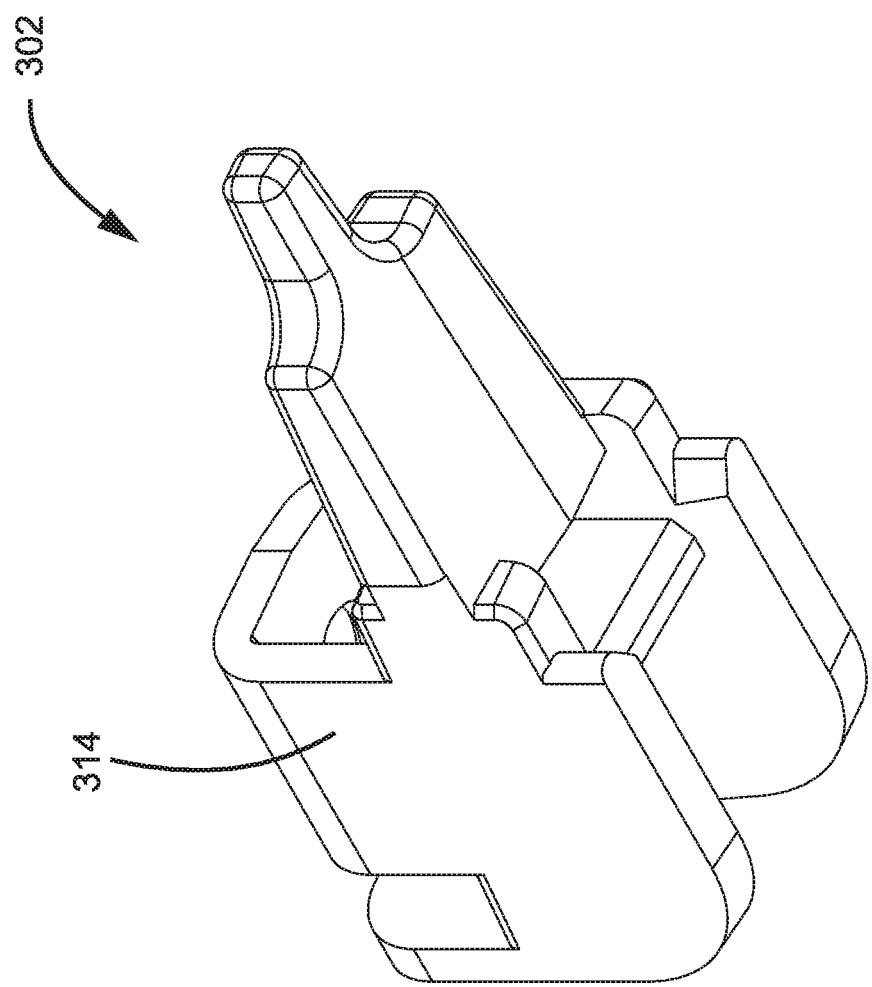
FIG. 7 is a perspective view of the strength member anchor adapter of the cable fixation assembly of FIG. 2.
Figure 8:
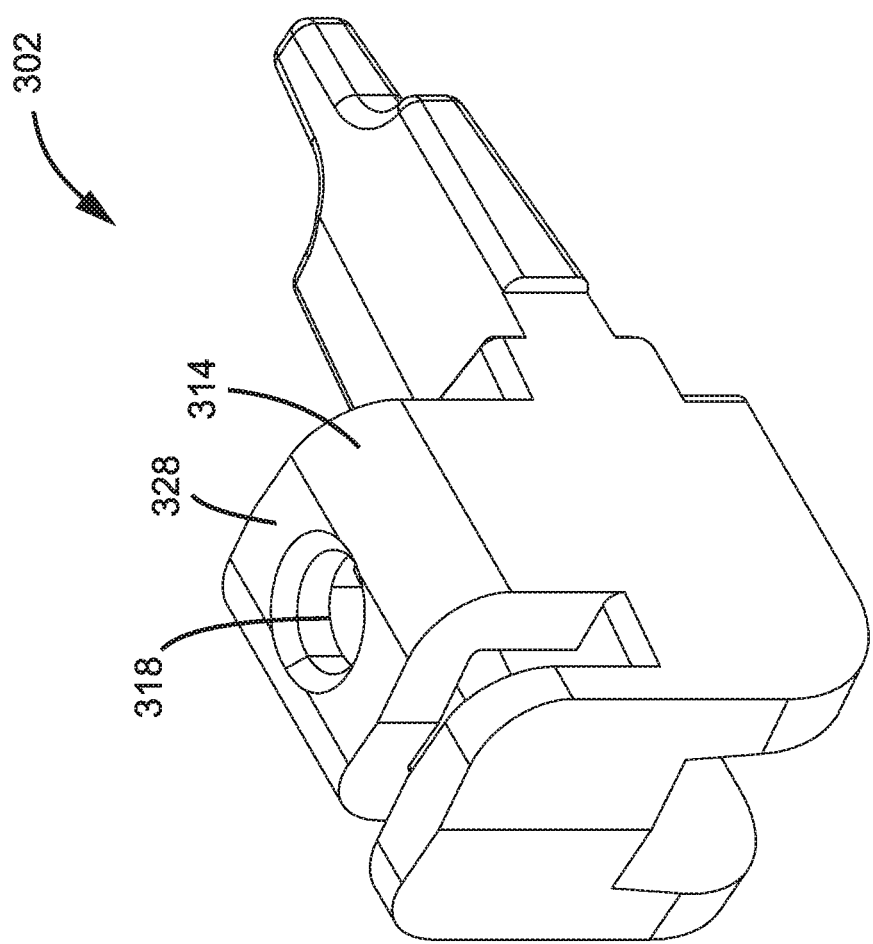
FIG. 8 is a further perspective view of the strength member anchor adapter of FIG. 6.
Figure 9:
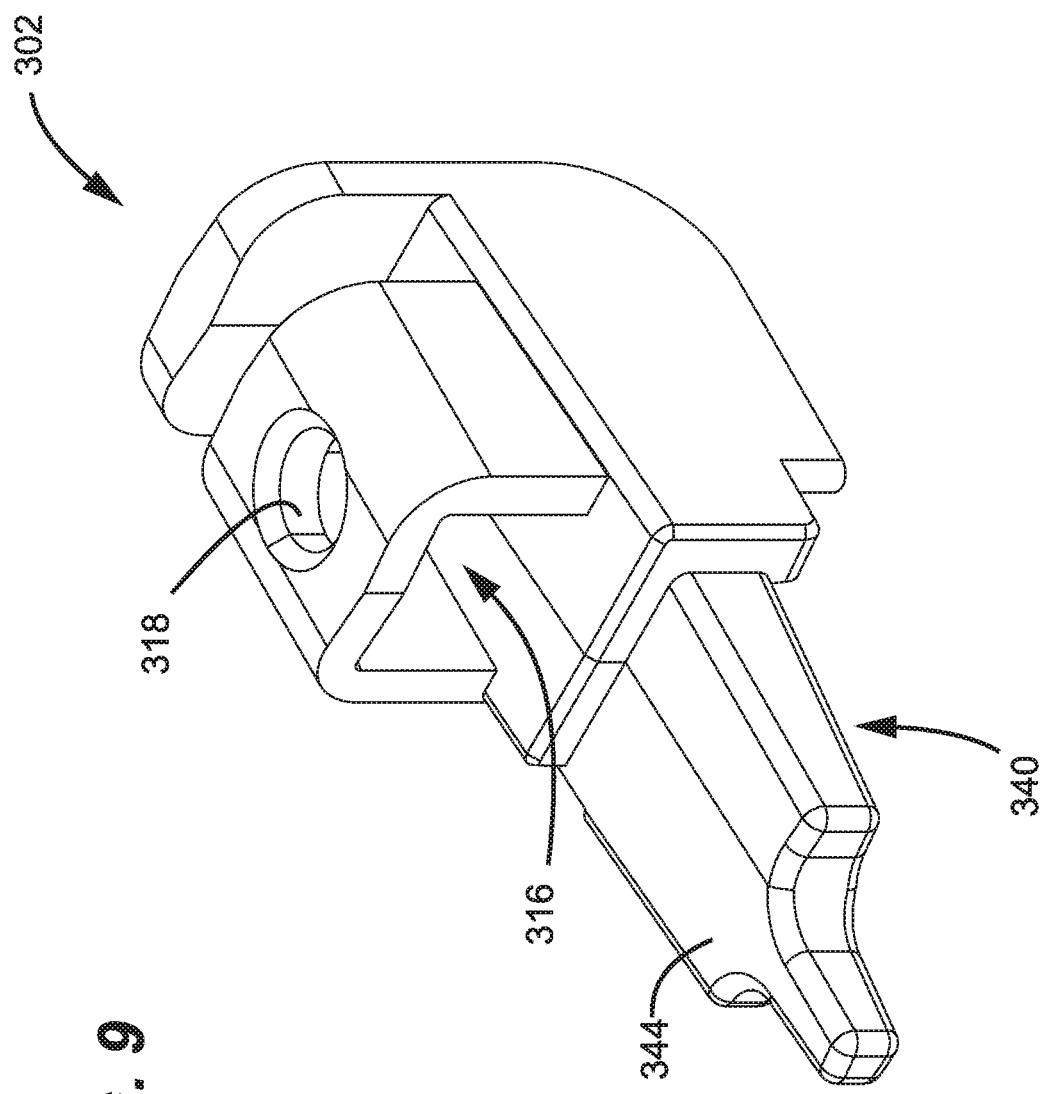
FIG. 9 is a further perspective view of the strength member anchor adapter of FIG. 6.
Figure 10:
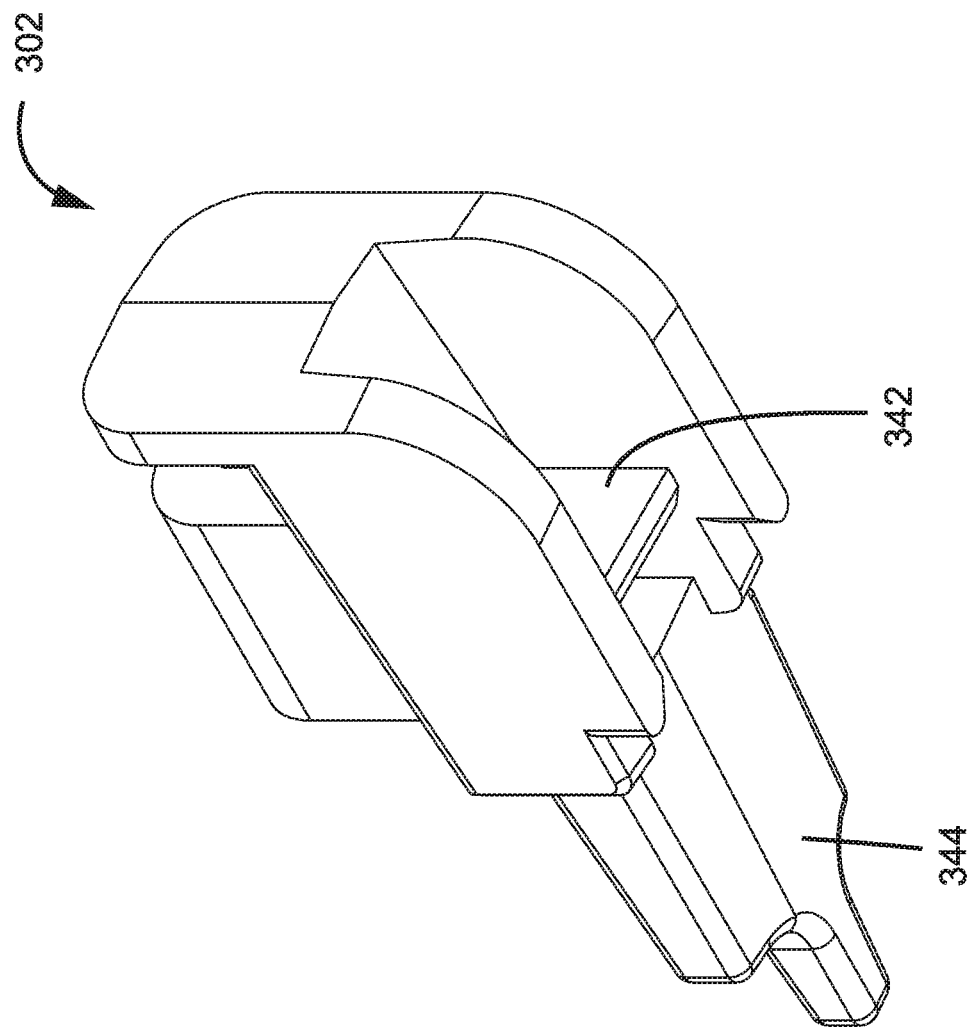
FIG. 10 is a further perspective view of the strength member anchor adapter of FIG. 6.
Figure 12:
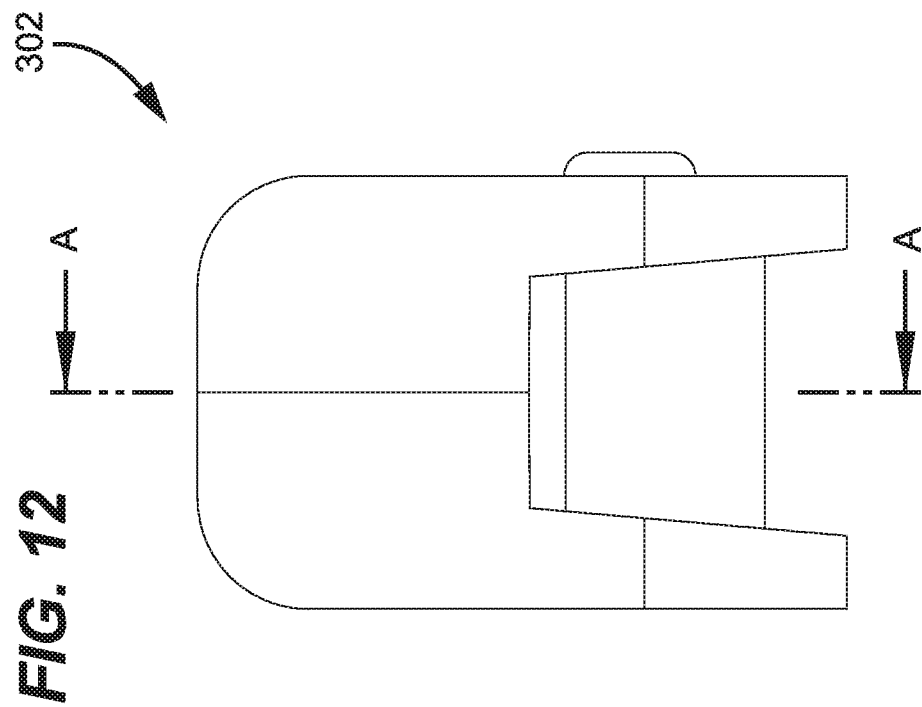
FIG. 12 is a distal end view of the strength member anchor adapter of FIG. 6.
Figure 11:
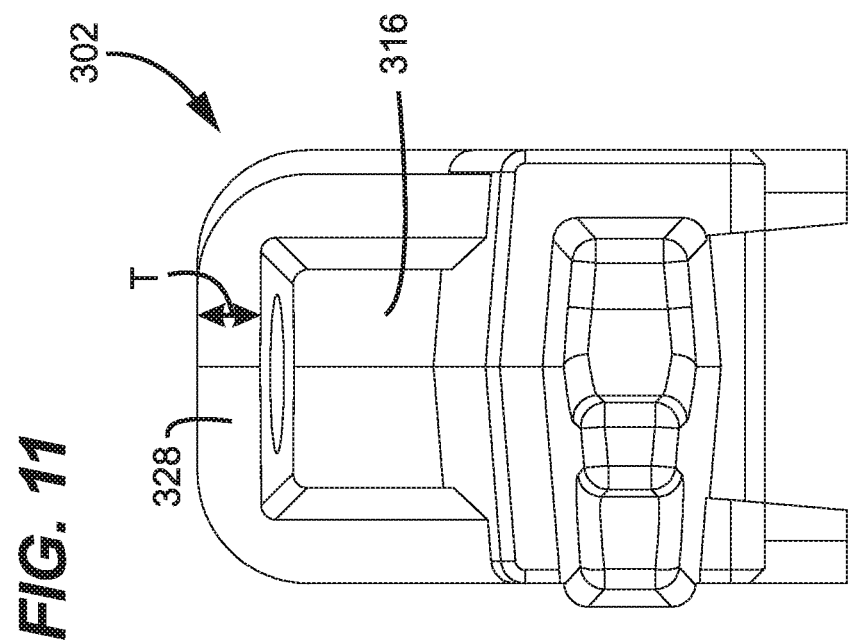
FIG. 11 is a proximal end view of the strength member anchor adapter of FIG. 6.
Figure 13:
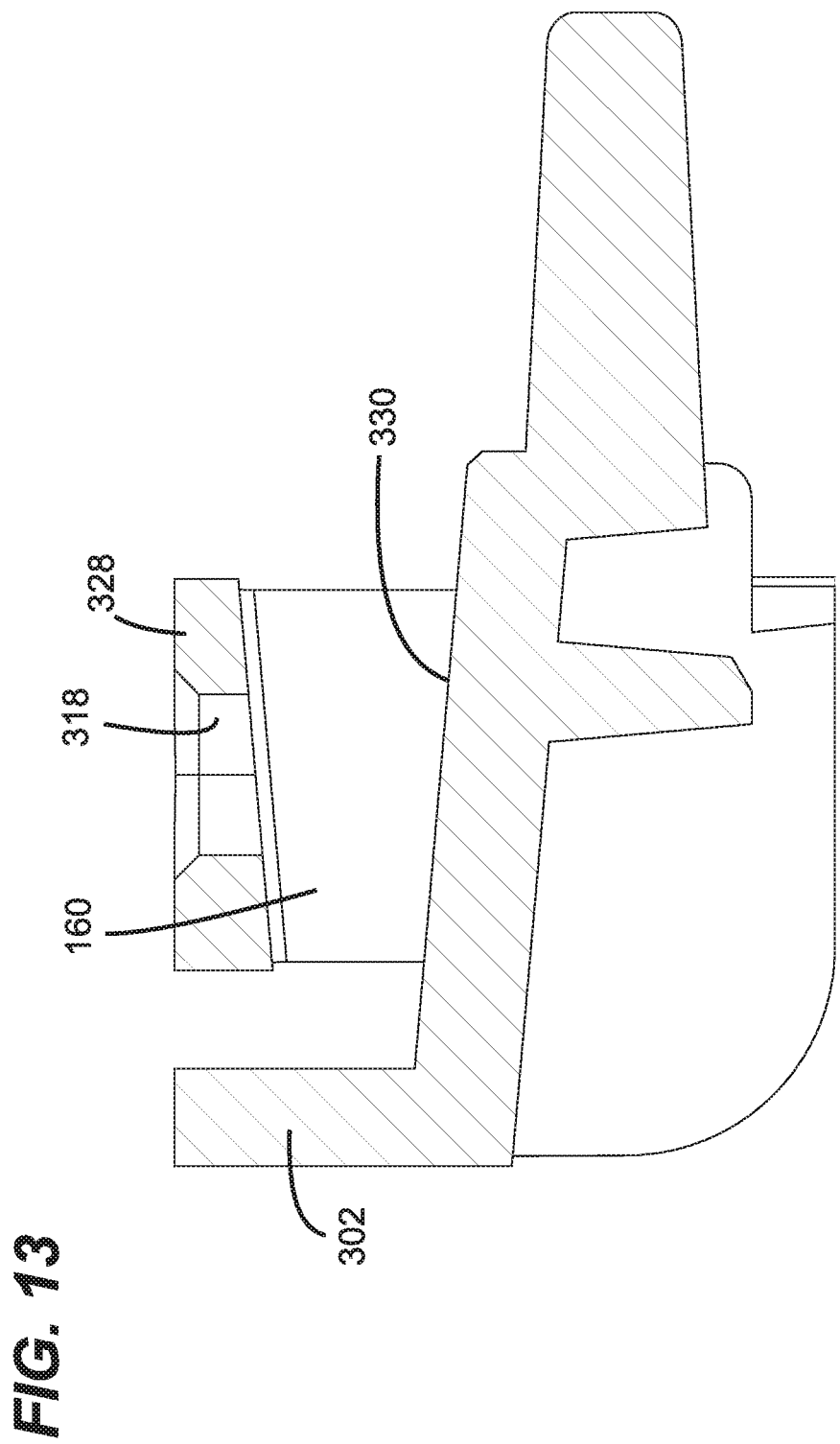
FIG. 13 is a cross-sectional view of the strength member anchor adapter of FIG. 6 along the line A-A in FIG. 11.

Referring now to FIG. 3, the cable support body 102 is elongate along a longitudinal axis 104. The cable support body 102 extends vertically from a top 114 of the cable support body 102 to a bottom 116 of the cable support body 102.

In some examples, the cable support body 102 is a unitary molded polymer structure. In some examples, the cable support body 102 includes metal.

The cable support body 102 defines a seat 118 having a horizontal cable support surface 120 facing vertically upwards and opposing walls 122 on opposite sides of the horizontal cable support surface 120. The seat 118 is seating the outer jacket 92 of a telecommunications cable 90. The cable 90 has a longitudinal axis 91, carries one or more optical fibers 94 and a yarn strength member 96 (schematically represented). The outer jacket 92 of the cable 90 is secured to the cable support body 102 with tie wraps 200 that are fed through tie wrap passages defined by the cable support body 102 and around the cable 90.

The cable support body 102 includes a strength member anchoring arrangement including a radial channel 130 and a longitudinal channel 133. The yarn strength member 96 is placed in the radial channel 130 and the longitudinal channel 133, and a free end portion of the yarn strength member 96 is then folded over the more proximal tie wrap 200 and tightened under the more distal tie wrap 200 to secure the strength member 96 to the cable support body 102.

The cable support body also includes a coupler 131 for lockingly engaging a strength member anchor adapter for anchoring a rigid strength rod of a telecommunications cable.

Referring now to FIGS. 4-13, the cable support body 102 includes legs 124 with feet 126 extending from the legs. The legs 124 and feet 126 are configured to engage the slots 52 of the base plate 50 (FIG. 2) to mount the cable support body 102 to the base plate 50 (FIG. 2). A slot-engageable locking member is positioned proximally to one of the feet 126 and configured to enter the same slot as the corresponding foot to minimize or prevent undesired proximally directed shifting of the cable support body 102 once it is mounted to the base plate 50.

The cable support body 102 includes a coupler 131 to which the strength member anchor adapter 300 can be lockingly coupled and unlocked to be decoupled from the cable support body 102. The strength member anchor adapter 300 is adapted to anchor a rod strength remember, e.g., a rigid metal or fiberglass rod strength member. Coupling the adapter 300 to the cable support body 102 and decoupling the adapter 300 from the cable support body 102 allows the cable fixation assembly 100 to be easily converted between one that accommodates fixation of a cable having a rod strength member (and, optionally, also a yarn strength member) and a cable fixation assembly 100 that accommodates fixation of a cable having only a yarn strength member.

The tie wraps secure the outer jacket 82 of the cable 80 to the cable support body 102. In this example, the tie wraps 200 are zip ties. In other examples, the tie wraps can be, e.g., any form of tightenable strip, e.g., a twist tie, a hose clamp, etc.

The strength member anchor adapter 300 includes a main body 302, a press screw 304 and a bracket 306. The press screw 304 includes a screw head 310, and a threaded shaft 308 extending from the head 310 to a tip 312 of the shaft 308. One or more of these components of the strength member anchor adapter can be metallic or non-metallic (e.g., made from a polymeric material).

The main body 302 of the strength member anchor adapter 300 includes a passage wall 314 that defines a strength rod passage 316, the passage wall 314 including a through hole 318 for receiving the press screw 304.

The bracket 306 includes a press plate 320, an upper plate 322 having a through hole 324, and a connector 326 connecting the press plate 320 and the upper plate 322. The bracket 306 is configured to straddle an upper portion 328 of the passage wall 314 such that the press plate 320 is within the strength rod passage 316 and the upper plate 322 is outside of the strength rod passage and above the upper portion 328 of the passage wall 314. In this configuration, the press plate 320 is engageable by the tip 312 of the press screw 304 extending through the through hole 324 of the upper plate 322 and through the through hole 318 of the passage wall 314 to bend the press plate 320 at an obtuse angle α away from the vertical, which includes a nonzero acute angle relative to the horizontal (FIG. 5), such that the press plate 320 is distally inclined downward as it extends away from the connector 326.

The main body 302 of the strength member anchor adapter 300 includes a ramp 330 at a bottom of the strength rod passage 316, the ramp 330 being distally inclined (i.e., as the ramp extends in the distal direction) upward relative to the horizontal. Thus, the inclines of the bent press plate 320 and the ramp 330 approach each other in the distal direction. The strength rod 84 of the cable 80 is squeezed between the ramp 330 and the bent press plate 320 to secure the strength rod 84 in a generally vertical central position of the strength rod passage 316. The bent press plate 320 engages the strength rod 84 distally of the shaft 308 of the press screw 304.

The vertical height H of the connector 326 is generally equal to the vertical thickness T of the upper portion 328 of the passage wall 314. Thus, the bracket 306 is configured to frictionally hold itself to the upper portion 328 of the passage wall 314 against, e.g., a force of gravity. This self-retention feature of the bracket 306 facilitates handling of the strength member anchor adapter 300 and of securing a strength rod therein in that that there are fewer moving parts when properly placing the strength rod 84, the bracket 306 and the press screw 304 for tightening the press screw 304.

In some examples, the press plate 320 cannot contact the strength rod 84 prior to bending the press plate 320 with the press screw 304.

The coupler 131 includes a cavity 160 defined by the cable support body 102 and a resilient latch arm 162 extending distally away from the cavity 160, the latch arm including a catch 164. Complementarily, the main body 302 of the strength member anchor adapter 300 includes a second coupler 340 having a shoulder 342 and a plug 344 extending proximally away from the shoulder 342. The plug 344 is adapted to be received in the cavity 160, and the shoulder 342 is adapted to engage the catch 164 to lockingly couple the strength member anchor adapter 300 to the cable support body 102. To release the adapter 300 from the cable support body 102, the latch arm 162 can be flexed downward to disengage the catch 164 from the shoulder 342, such that the plug 344 can then be removed from the cavity 160.

Optionally, the plug 344 and the cavity 160 are complementarily keyed to each other to permit receiving of the plug 344 by the cavity 160 in only one orientation. Thus, for example, a transverse cross-section of the plug 344 (transverse to the proximal to distal direction) is asymmetrical. In addition, the asymmetry of the plug can provide for greater robustness of the plug at the side of the fixation assembly where the longitudinal channel of the strength member arrangement is disposed. The radial channel can reduce the robustness of the overall cable fixation assembly, while the complementary larger side of the plug 344 can the improve the overall robustness of the cable fixation assembly.

The main body 302 of the strength member anchor adapter 300 includes a distal stop 370 positioned distally of the strength rod passage 316. The distal stop 370 is a wall configured to stop creeping of the strength rod 84 distally beyond the distal stop 370. Such creeping can occur when securing the cable 80 and/or when environmental conditions change, and is undesirable, as it can damage delicate optical fibers in the vicinity.

Figure 14:
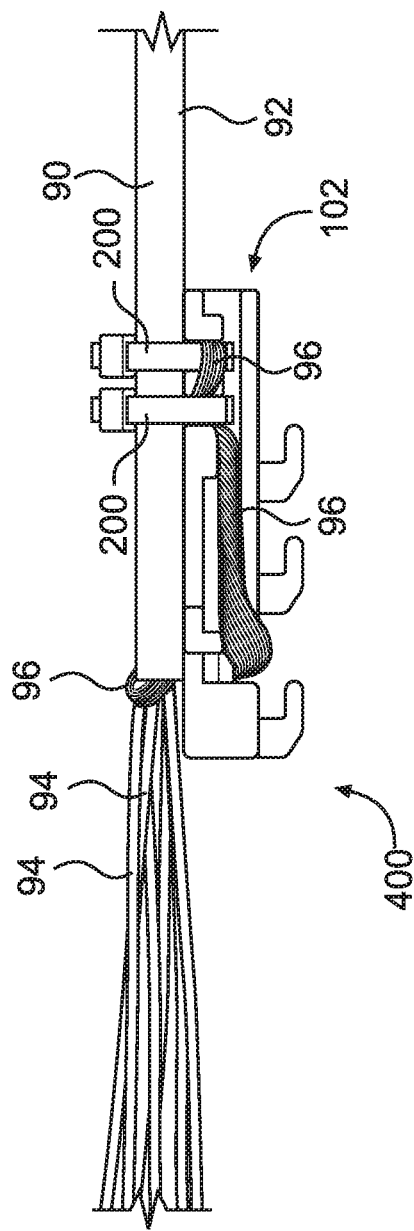
FIG. 14 is a view of an example cable fixation assembly in accordance with the present disclosure to which is secured a cable having a yarn strength member.

FIG. 14 shows an example cable fixation assembly 400 in accordance with the present disclosure to which is secured a cable 90 having an outer jacket 92, optical fibers 94, and a yarn strength member 96. The outer jacket 92 is secured to the cable support body 102 with a pair of tie wraps 200. The yarn strength member 96 is secured to the cable support body using the radial and longitudinal channels of the strength member anchor arrangement of the cable support body 102, and including the tie wraps 200. The cable fixation assembly 400 does not include a strength rod anchor adapter. However, the cable support body 102 is adapted to couple a strength rod anchor adapter.

Figure 15:
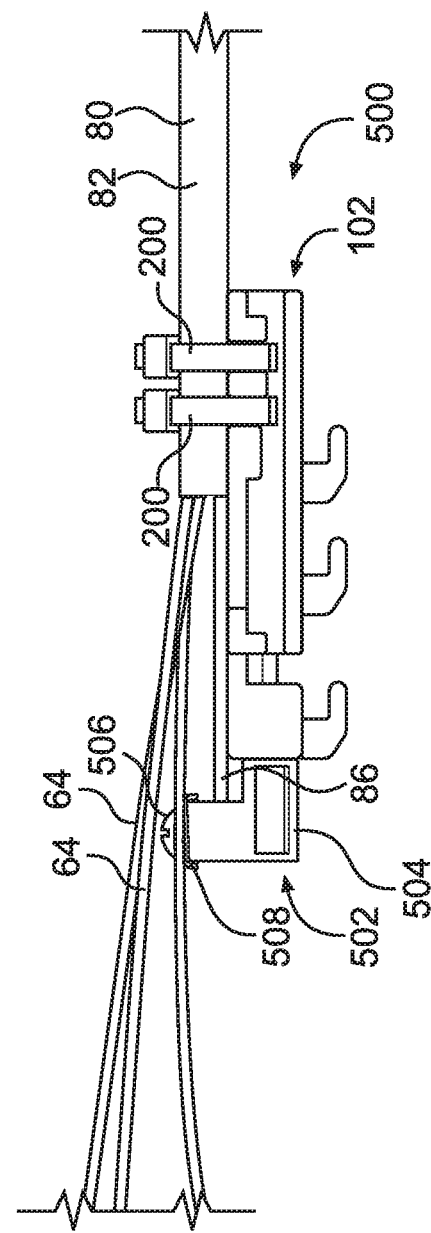
FIG. 15 is a view of the cable fixation assembly of FIG. 14 to which is secured a cable having a rigid rod strength member, the assembly also including an example strength member anchor adapter in accordance with the present disclosure.
Figure 16:
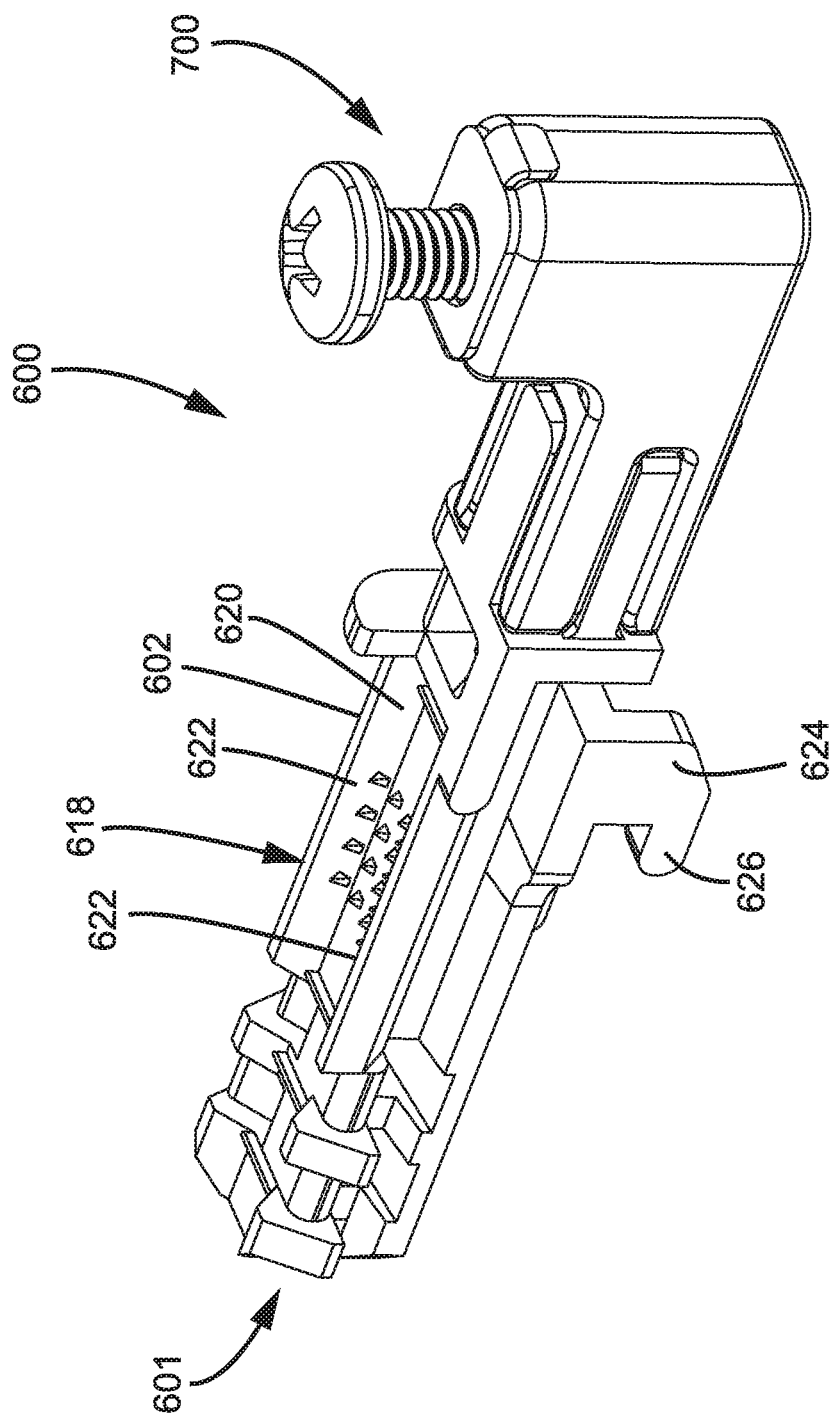
FIG. 16 is a perspective view of a further example cable fixation assembly in accordance the present disclosure.
Figure 17:
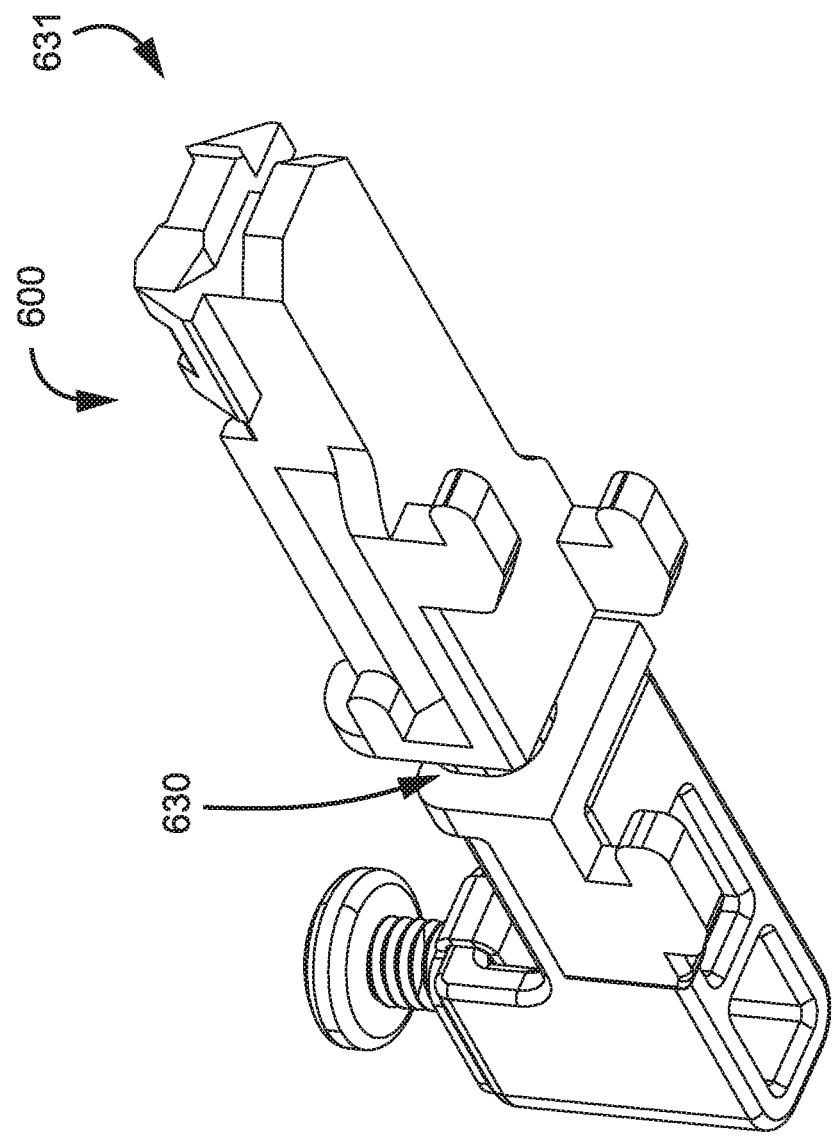
FIG. 17 is a further perspective view of the cable fixation assembly of FIG. 16.
Figure 18:
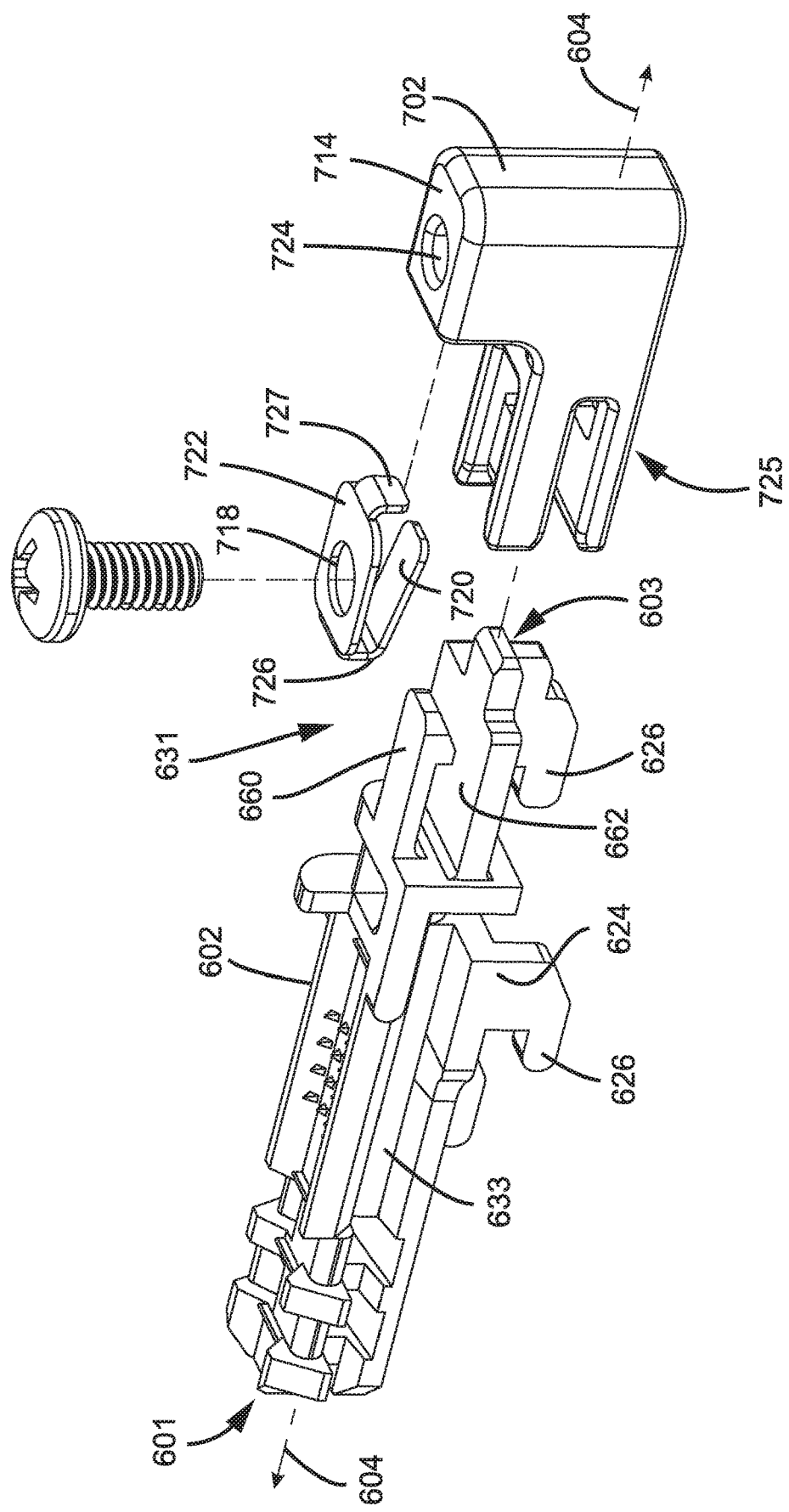
FIG. 18 is an exploded view of the cable fixation assembly of FIG. 16.
Figure 19:
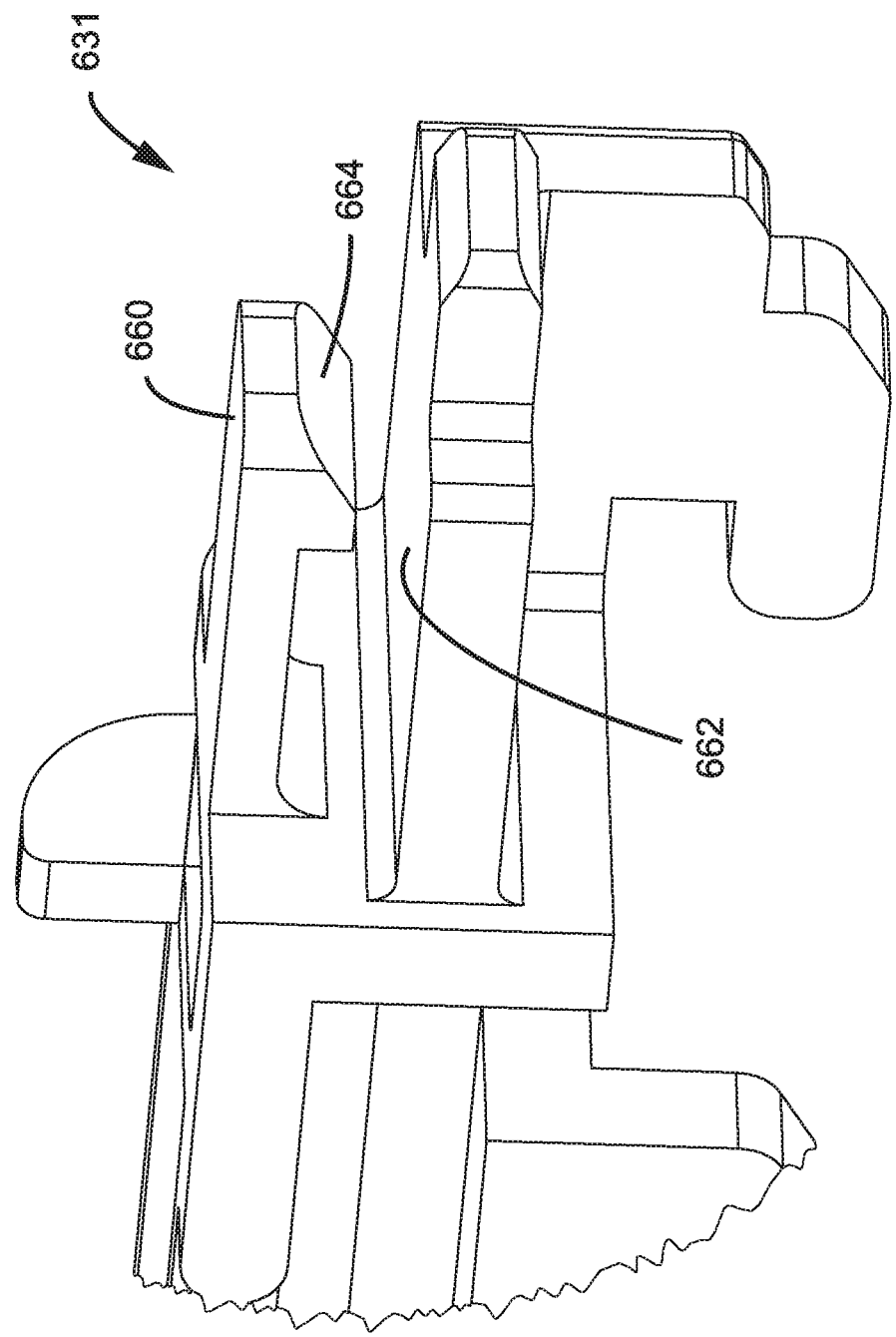
FIG. 19 is a perspective view of a portion of the cable fixation assembly of FIG. 16.
Figure 20:
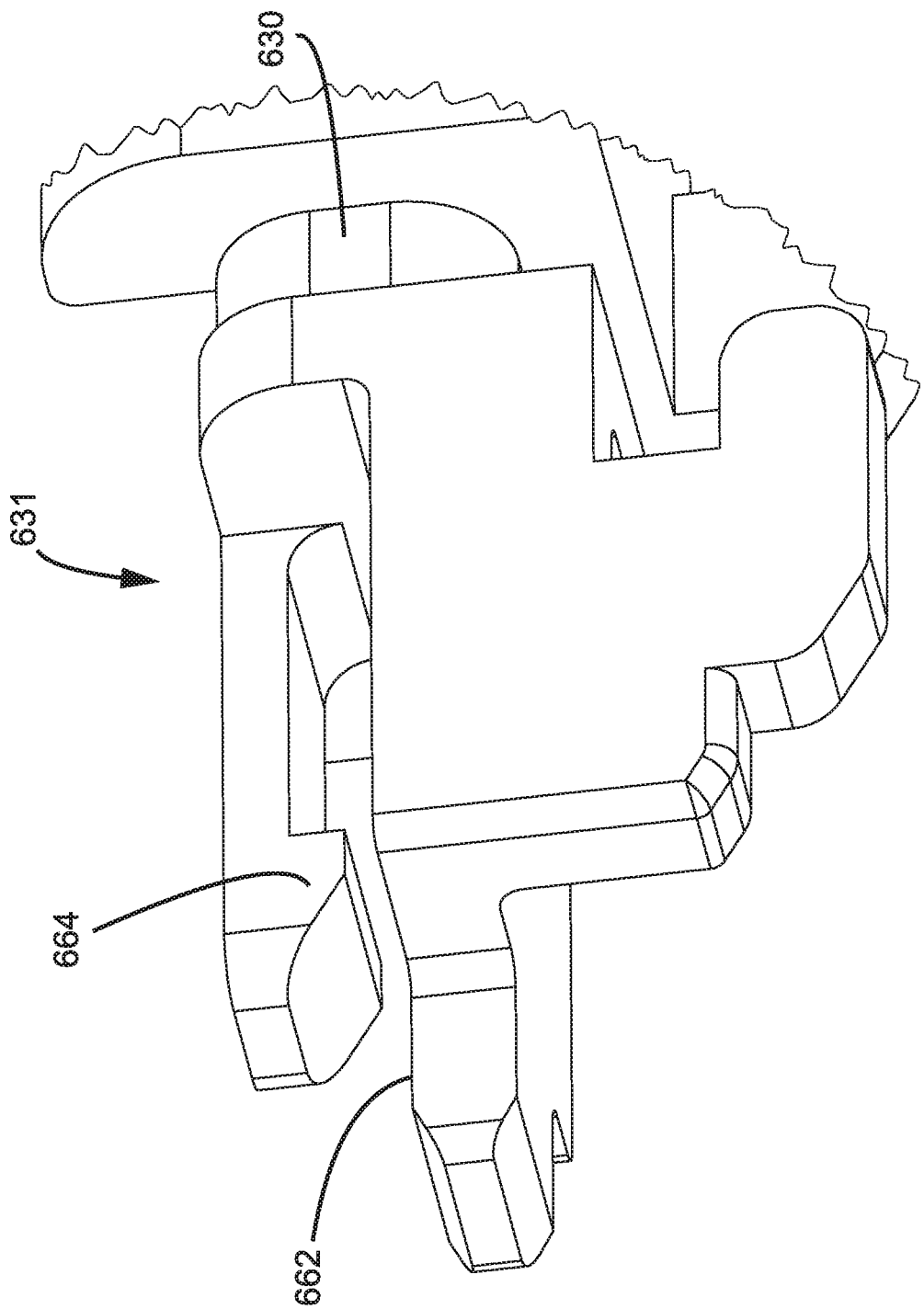
FIG. 20 is a further perspective view of the portion of the cable fixation assembly of FIG. 19.
Figure 21:
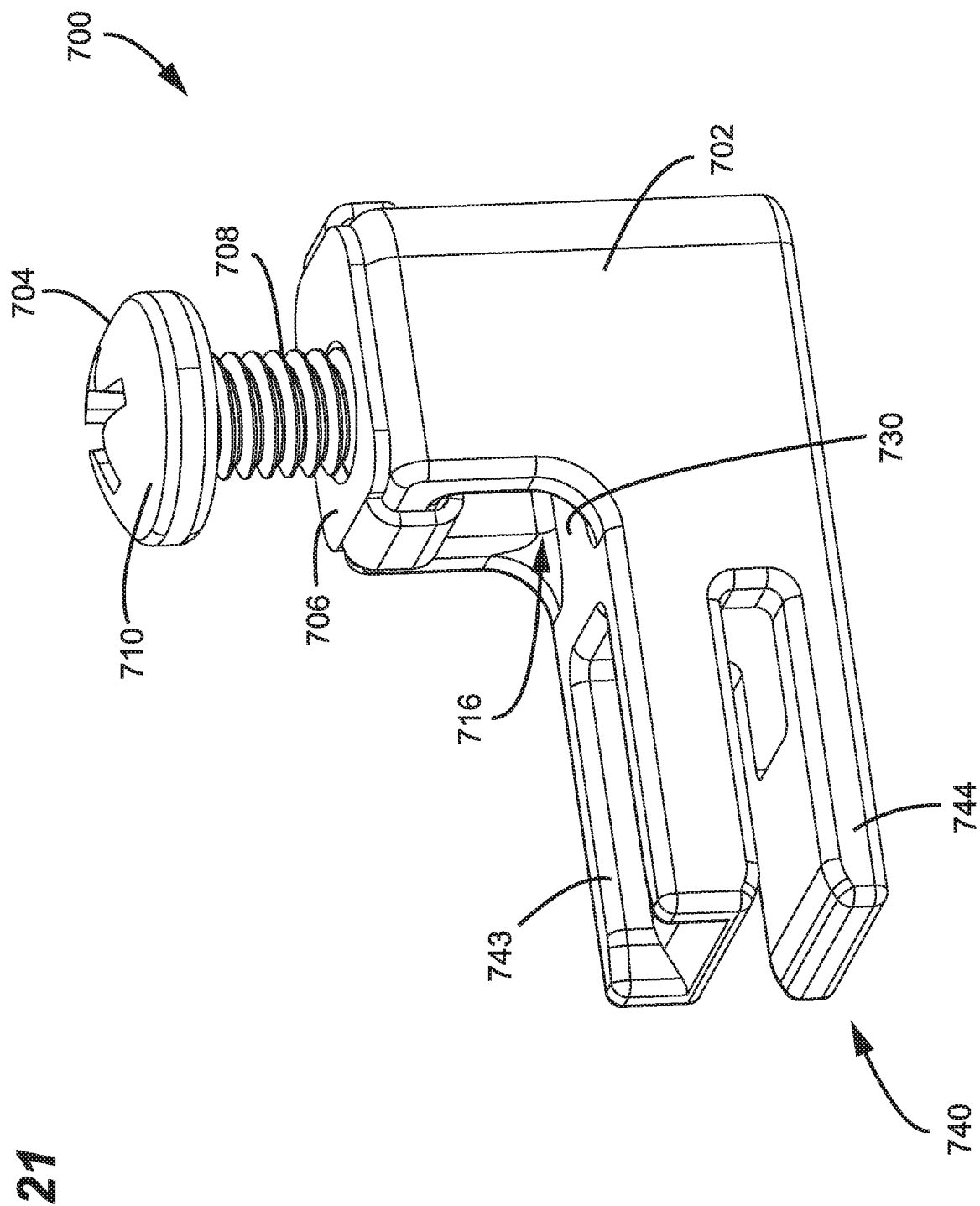
FIG. 21 is a perspective view of the strength member anchor adapter of the cable fixation assembly of FIG. 16.
Figure 22:
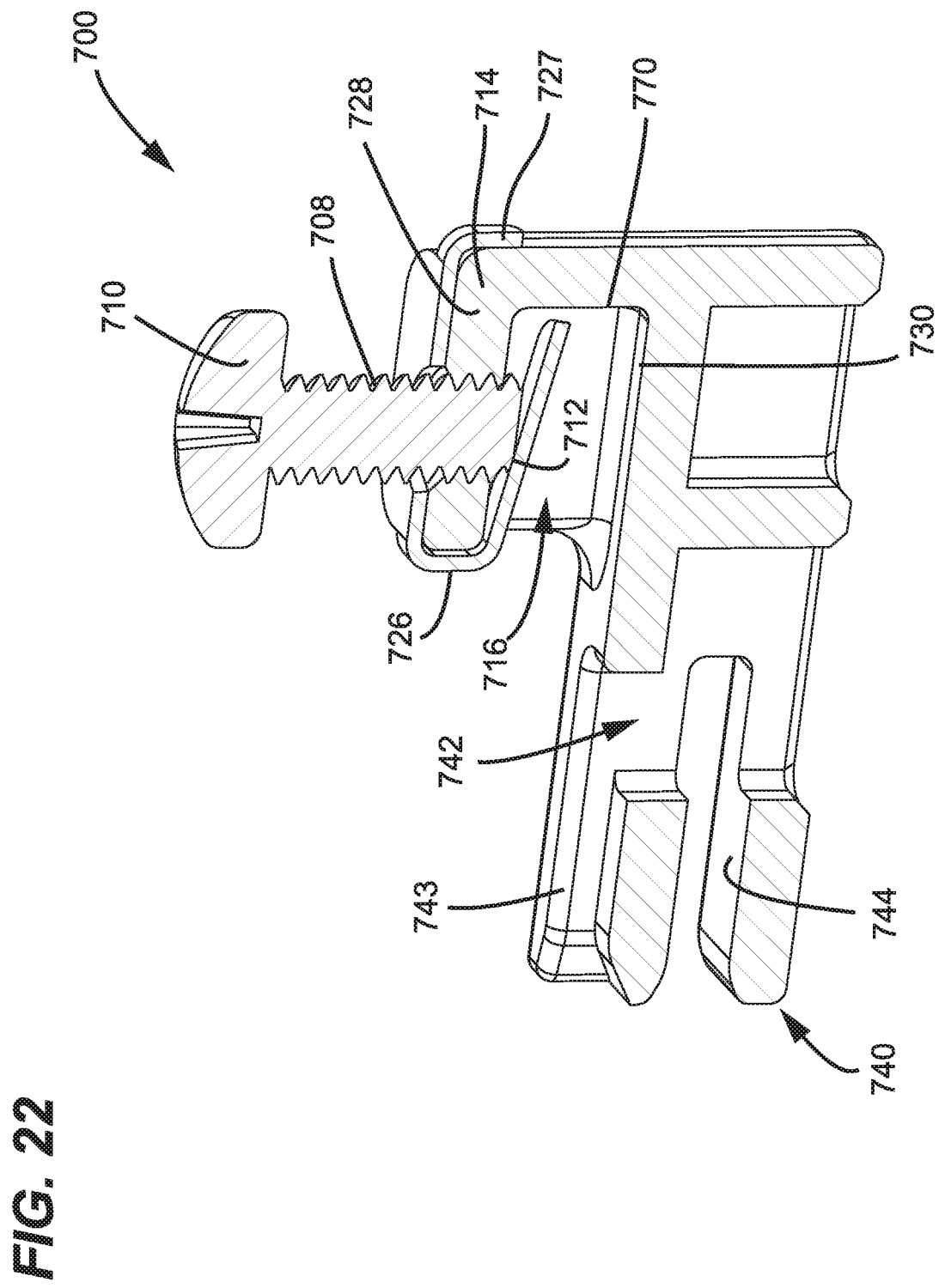
FIG. 22 is a perspective, cross-sectional view of the strength member anchor adapter of the cable fixation assembly of FIG. 16.

FIG. 15 is a view of the cable fixation assembly 500 to which is secured a cable 80 having an outer jacket 82, optical fibers 64, and a rod strength member 86. A strength member anchor adapter 502 is lockingly coupled to the cable support body 102 and includes a main body 504 and a press screw 506. The rod strength member 86 is anchored between a press plate of a bracket 508 of the adapter 502 and a bottom surface of a strength member passage defined by the main body 504.

It can be appreciated that the assembly 400 can be converted to the assembly 500 by introducing and coupling the adapter 502 to the cable support body 102. Correspondingly, the assembly 500 can be converted to the assembly 400 by decoupling the adapter 502 from the cable support body 102 and removing the adapter 502.

Referring now to FIGS. 16-22 a further example cable fixation assembly 600 in accordance with the present disclosure will be described. The assembly 600 includes a cable support body 602 that is elongate along a longitudinal axis 604 between a proximal end 601 and a distal end 603. The cable support body 602 extends vertically from a top 614 of the cable support body 602 to a bottom 616 of the cable support body 602.

In some examples, the cable support body 602 is a unitary molded polymer structure. In some examples, the cable support body 602 includes metal.

The cable support body 602 defines a seat 618 having a horizontal cable support surface 620 facing vertically upwards and opposing walls 622 on opposite sides of the horizontal cable support surface 620. The cable support body 602 includes tie wrap passages that receive tie wrap passages for securing the cable to the cable support body 602.

The cable support body 602 includes a strength member anchoring arrangement including a radial channel 630 and a longitudinal channel 633. A yarn strength member 96 can be placed in the radial channel 630 and the longitudinal channel 633 and secured with tie wraps as described above.

The cable support body 602 includes legs 624 with feet 626 extending from the legs. The legs 624 and feet 626 are configured to engage the slots 52 of the base plate 50 (FIG. 2) to mount the cable support body 102 to the base plate 50 (FIG. 2). A slot-engageable locking member is positioned proximally to one of the feet 626 and configured to enter the same slot as the corresponding foot to minimize or prevent undesired proximally directed shifting of the cable support body 602 once it is mounted to the base plate 50.

The cable support body 602 includes a coupler 131 to which the strength member anchor adapter 700 can be lockingly coupled and unlocked to be decoupled from the cable support body 602. The strength member anchor adapter 700 is adapted to anchor a rod strength remember, e.g., a rigid metal or fiberglass rod strength member. Coupling the adapter 700 to the cable support body 602 and decoupling the adapter 700 from the cable support body 602 allows the cable fixation assembly 600 to be easily converted between one that accommodates fixation of a cable having a rod strength member (and, optionally, also a yarn strength member) and a cable fixation assembly 600 that accommodates fixation of a cable having only a yarn strength member.

The strength member anchor adapter 700 includes a main body 702, a press screw 704 and a bracket 706. The press screw 704 includes a screw head 710, and a threaded shaft 708 extending from the head 710 to a tip 712 of the shaft 708. One or more of these components of the strength member anchor adapter can be metallic or non-metallic (e.g., made from a polymeric material).

The main body 702 of the strength member anchor adapter 700 includes a passage wall 714 that defines a strength rod passage 716, the passage wall 714 including a through hole 718 for receiving the press screw 704.

The bracket 706 includes a press plate 720, an upper plate 722 having a through hole 724, a connector 726 connecting the press plate 720 and the upper plate 722, and a retainer finger 727 opposite the connector 726 and adapted to engage the main body 702 to better stabilize the bracket 706 relative to the main body 702. The bracket 706 is configured to straddle an upper portion 728 of the passage wall 714 such that the press plate 720 is within the strength rod passage 716 and the upper plate 722 is outside of the strength rod passage and above the upper portion 728 of the passage wall 714. In this configuration, the press plate 720 is engageable by the tip 712 of the press screw 704 extending through the through hole 724 of the upper plate 722 and through the through hole 718 of the passage wall 714 to bend the press plate 720 at an obtuse angle β away from the vertical, which includes a nonzero acute angle relative to the horizontal, such that the press plate 720 is distally inclined downward as it extends away from the connector 726.

The main body 702 of the strength member anchor adapter 700 includes a rod engagement surface 730 (in this example, the surface 730 is, but need not be, horizontal) at a bottom of the strength rod passage 716. A strength rod can be squeezed between the rod engagement surface 730 and the bent press plate 720 to secure the strength rod in the strength rod passage 716.

The vertical height H2 of the connector 726 is generally equal to the vertical thickness T2 of the upper portion 728 of the passage wall 714. Thus, the bracket 706 is configured to frictionally hold itself to the upper portion 728 of the passage wall 714 against, e.g., a force of gravity. This self-retention feature of the bracket 706 facilitates handling of the strength member anchor adapter 700 and of securing a strength rod therein in that that there are fewer moving parts when properly placing the strength rod, the bracket 706, and the press screw 704 for tightening the press screw 704.

The coupler 631 includes an upper latch arm 660 and a lower support surface 662. The latch arm 660 includes a catch 664. Complementarily, the main body 702 of the strength member anchor adapter 700 includes a second coupler 740 having an upper latch engagement arm 743 defining an opening 742 for receiving the catch 664, and a lower support arm 744 that slots between the latch arm 660 and the lower support surface 662 for a robust coupling of the adapter 700 and the cable support body 600. To release the adapter 700 from the cable support body 602, the latch arm 660 can be flexed upward to disengage the catch 664 from the opening 742, such that the adapter 700 can then be removed from the assembly 600.

The main body 702 of the strength member anchor adapter 700 includes a distal stop 770 positioned at the distal end of the strength rod passage 716. The distal stop 770 is a wall configured to stop creeping of a strength rod distally beyond the distal stop 770. Such creeping can occur when securing the cable 80 and/or when environmental conditions change, and is undesirable, as it can damage delicate optical fibers in the vicinity.

From the foregoing detailed description, it will be evident that modifications and variations can be made in the devices of the disclosure without departing from the spirit or scope of the invention.

What is claimed is:

1. A cable fixation assembly, comprising:
  a cable support body extending between a proximal end and an opposite distal end along a longitudinal axis of the cable support body, the cable support body including:
    a seat for seating a telecommunications cable;
    a strength member anchoring arrangement adapted to anchor a cable strength member of a first type; and
    a first coupler; and
  a strength member anchor adapter adapted to lockingly couple to the first coupler and further adapted to anchor a cable strength member of a second type, the second type being different from the first type.

2. The cable fixation assembly of claim 1, wherein the first type of cable strength member is a yarn type and the second type of cable strength member is a rod type.

3. The cable fixation assembly of claim 1, wherein the strength member anchoring arrangement includes a radial channel and a longitudinal channel for guiding the cable strength member of the first type to one or more tie wraps that secure the cable strength member of the first type to the cable support body.

4. The cable fixation assembly of claim 1, wherein the strength member anchor adapter is lockingly coupled to the cable support body.

5. The cable fixation assembly of claim 1, wherein the strength member anchor adapter is not coupled to the cable support body.

6. The cable fixation assembly of claim 4, further comprising a cable secured to the cable support body, the cable including a rod strength member that is anchored to the strength member anchor adapter.

7. The cable fixation assembly of claim 5, further comprising a cable secured to the cable support body, the cable including a yarn strength member anchored to the strength member anchoring arrangement.

8. The cable fixation assembly of claim 1, wherein the strength member anchor adapter includes a main body, a bracket, and a press screw.

9. The cable fixation assembly of claim 8,
  wherein the first coupler includes a cavity defined by the cable support body and a latch arm extending distally away from the cavity, the latch arm including a catch; and
  wherein the main body of the strength member anchor adapter includes a second coupler having a shoulder and a plug extending proximally away from the shoulder, the plug being adapted to be received in the cavity, and the shoulder being adapted to engage the catch to lockingly couple the strength member anchor adapter to the cable support body.

10. The cable fixation assembly of claim 9, wherein the plug and the cavity are complementarily keyed to each other to permit receiving of the plug by the cavity in only one orientation.

11. The cable fixation assembly of claim 8,
  wherein the main body of the strength member anchor adapter includes a passage wall that defines a strength rod passage, the passage wall including a through hole for receiving the press screw;
  wherein the bracket includes a press plate, an upper plate having a through hole, and a connector connecting the press plate and the upper plate; and
  wherein the bracket is configured to straddle the passage wall such that the press plate is within the strength rod passage and the upper plate is outside of the strength rod passage, and such that the press plate is engageable by the press screw extending through the through hole of the upper plate and through the through hole of the passage wall to bend the press plate.

12. The cable fixation assembly of claim 11,
  wherein the seat includes a horizontal cable support surface facing vertically upward; and
  wherein when the press screw engages the press plate, the press plate bends at a downward incline away from horizontal.

13. The cable fixation assembly of claim 12, wherein the main body of the strength member anchor adapter includes a ramp at a bottom of the strength rod passage, the ramp being distally inclined upward.

14. The cable fixation assembly of claim 13, wherein the bracket straddles the passage wall such that when the press screw engages the press plate, the press plate bends such that it is distally inclined downward.

15. A method of fixing a portion of a telecommunications cable, comprising:
  providing a cable support body extending between a proximal end and an opposite distal end along a longitudinal axis of the cable support body, the cable support body including:
    a seat for seating a telecommunications cable;
    a strength member anchoring arrangement adapted to anchor a cable strength member of a first type; and
    a first coupler;
  providing a strength member anchor adapter adapted to anchor a cable strength member of a second type, the second type being different from the first type; and at least one of:
    i) lockingly coupling the strength member anchor adapter to the first coupler and anchoring a cable strength member of the second type to the strength member anchor adapter; and
    ii) decoupling the strength member anchor adapter from the first coupler and anchoring a cable strength member of the first type to the strength member anchoring arrangement.

16. The method of claim 15, wherein the strength member of the first type is a yarn strength member and the strength member of the second type is a rod strength member.

17. The cable fixation assembly of claim 8,
  wherein the first coupler includes a latch arm, the latch arm including a catch, and a support surface vertically spaced apart from, and below, the latch arm; and
  wherein the main body of the strength member anchor adapter includes a second coupler having a latch engagement arm defining an opening, and a support arm below and spaced apart from the latch engagement arm, the support arm being adapted to be received between the latch arm and the support surface while the catch resiliently engages the opening.

* * * * *